US 8,812,439 B2

(12) United States Patent
King et al.

(10) Patent No.: US 8,812,439 B2
(45) Date of Patent: Aug. 19, 2014

(54) FOLDER STRUCTURE AND AUTHORIZATION MIRRORING FROM ENTERPRISE RESOURCE PLANNING SYSTEMS TO DOCUMENT MANAGEMENT SYSTEMS

(75) Inventors: Nigel King, San Mateo, CA (US); Nigel Smith, Redwood Shores, CA (US); Rajesh Singh, Campbell, CA (US)

(73) Assignee: Oracle International Corporation, Redwood Shores, CA (US)

( * ) Notice: Subject to any disclaimer, the term of this patent is extended or adjusted under 35 U.S.C. 154(b) by 150 days.

(21) Appl. No.: 13/053,899

(22) Filed: Mar. 22, 2011

(65) Prior Publication Data

US 2012/0246115 A1 Sep. 27, 2012

(51) Int. Cl.
  *G06F 7/00* (2006.01)
  *G06F 17/00* (2006.01)
  *G06F 17/30* (2006.01)
  *G06F 21/62* (2013.01)

(52) U.S. Cl.
  CPC ...... *G06F 21/6227* (2013.01); *G06F 17/30176* (2013.01)
  USPC .......................................... 707/626; 707/655

(58) Field of Classification Search
  None
  See application file for complete search history.

(56) References Cited

U.S. PATENT DOCUMENTS

| | | | | |
|---|---|---|---|---|
| 6,308,173 | B1 * | 10/2001 | Glasser et al. | 1/1 |
| 6,553,365 | B1 * | 4/2003 | Summerlin et al. | 707/740 |
| 2003/0182304 | A1 * | 9/2003 | Summerlin et al. | 707/102 |
| 2004/0199540 | A1 * | 10/2004 | Nojima | 707/102 |
| 2005/0027757 | A1 * | 2/2005 | Kiessig et al. | 707/204 |
| 2008/0147747 | A1 * | 6/2008 | Cardamore | 707/200 |
| 2008/0270451 | A1 * | 10/2008 | Thomsen et al. | 707/102 |

(Continued)

FOREIGN PATENT DOCUMENTS

| | | | |
|---|---|---|---|
| EP | 2302577 A1 * | 3/2011 | |
| JP | 2008140285 A | 6/2008 | |
| WO | 2007137283 A2 | 11/2007 | |

OTHER PUBLICATIONS

The Open ERP Solution, obtained at http://doc.openerp.com/book/7/7_19_Documents/7_19_Documents_OpenERP.html; Jul. 29, 2010; 1 page.

(Continued)

*Primary Examiner* — Tony Mahmoudi
*Assistant Examiner* — Tuan A Pham
(74) *Attorney, Agent, or Firm* — Trellis IP Law Group, PC

(57) ABSTRACT

A system and accompanying method adapted to facilitate folder structure and authorization mirroring between a Document management System (DMS) and an Enterprise Resource Planning (ERP). An example method includes providing a first user option to view a representation of a database structure of a database application of an ERP system; displaying a second user option to select a portion of the representation of the database structure; and offering a third user option to create a folder structure for a Document Management System (DMS) based on the selected portion of the representation of the database structure. In a more specific embodiment, the method further includes providing a fourth user option to adjust permissions for users to access one or more folders of the folder structure based on permissions associated with a database object of the database structure. The fourth user option includes an option to synchronize one or more permissions and/or grants associated with the selected portion of the representation of the database structure with one or more ACLs associated with one or more folders of the folder structure.

13 Claims, 12 Drawing Sheets

(56) References Cited

U.S. PATENT DOCUMENTS

| | | |
|---|---|---|
| 2009/0089305 A1* | 4/2009 | Summerlin et al. .......... 707/100 |
| 2009/0254422 A1* | 10/2009 | Jenkins et al. ................. 705/11 |
| 2010/0161616 A1 | 6/2010 | Mitchell |

OTHER PUBLICATIONS

ERP Document Management Integration Solution Offering—MIKE 2.0, obtained at http://mike2.openmethodology.org/wiki/ERP_Document_Management_Integration_Solution_Offering; Jul. 29, 2010; 5 pages.

Deacom Mixes ERP and Document Management, obtained at http://www.cmswire.com/cms/enterprise-cms/deacom-mixes-erp-and-document-management-002626.php, Jul. 29, 2010, 3 pages.

ERP Software System in Pharmaceutical Industries, obtained at http://www.pharmainfo.net/reviews/erp-software-system-pharmaceutical-industries, Jul. 29, 2010; 7 pages.

Document Management Features for System Administrators, obtained at http://www.filehold.com/product/feature-system.htm; Jul. 29, 2010; 3 pages.

Document Management System (DMS), obtained at http://www.mt3cs.com/index.php?option=com_content&view=article&id=182&catid=72&Itemid=175; Jul. 29, 2010; 3 pages.

Document Management Module, obtained at http://www.canias.com/solutions/canias-doc1.html; Jul. 29, 2010; 2 pages.

* cited by examiner

FOLDER STRUCTURE AND AUTHORIZATION MIRRORING FROM ENTERPRISE RESOURCE PLANNING SYSTEMS TO DOCUMENT MANAGEMENT SYSTEMS

BACKGROUND

This application relates in general to software and more specifically to systems, methods, and user interfaces for facilitating mapping organizational relationships and access privileges between database structures and folder structures.

Methods for synchronizing database structures and folder structures are particularly important in enterprise computing environments, where lack of synchronization and organization can create costly inefficiencies. Conventionally, synchronization between database structures and folder structures is performed manually.

An example enterprise computing environment includes various database applications that are part of an Enterprise Resource Planning (ERP) system in combination with an independent Document Management System (DMS). The ERP databases may organize data and relationships via relational databases, while the DMS may maintain content, e.g., documents, via a folder structure of a file system or other persistent storage mechanism.

The DMS may maintain various files, such as scanned receipts, contracts, and other documents in a folder structure of a file system or other persistent storage mechanism. The folder structure may have various folders for different types of documents. Generally, the folders may be arbitrarily created, e.g., by a DMS administrator, such that no particular referential integrity or other organizational relationships must be maintained between folders. The data maintained in such a DMS is said to represent unstructured content. For the purposes of the present discussion, unstructured content may be any content that includes documents maintained in a folder structure of a file system or other persistent storage mechanism.

The databases of an ERP system may include various database objects, such as tables, which may reference other related tables or database objects within the database. For example, a database of a Supply Chain Management (SCM) component of an ERP software package may include a table pertaining to registered accounts, which refers to a table pertaining to suppliers, which refers to a table pertaining to payable invoices, which includes a record for a particular payable invoice, and so on. The invoice record maintained via the ERP system may have a corresponding scanned invoice maintained via the DMS. Various database objects, e.g., tables, invoice records, and so on, of a database are said to represent structured content, since the access to the content is via the predefined database structure, which may enforce referential integrity between tables, and so on. For the purposes of the present discussion, structured content may be any content maintained by a relational database or other software application designed to reference data in a file system or other persistent data storage mechanism.

Generally, for organizational purposes, businesses may manually attempt to have the folder structure of a DMS reflect the database structure of the ERP applications. However, an administrator or other authorized user of a DMS may be unable to accurately manually adjust the folder structure to match a rapidly changing database of an ERP. Furthermore, a DMS administrator may not immediately know how to adjust folder access rights when a new folder is created to reflect changes in an ERP database structure, especially when access rights of certain employees may have changed.

For example, an accounts payable administrator may wish to create a new folder when a new supplier is identified in an ERP application. Similarly, an administrator of a given business unit may wish to create a new folder structure in the DMS when a business unit engages in a new business function for which corresponding unstructured content will be stored in the DMS. Manual performance of such tasks may be undesirably time-consuming and error prone.

SUMMARY

An example method for facilitating mirroring a folder structure of a Document management System (DMS) with an organizational hierarchy of an Enterprise Resource Planning (ERP) includes providing a first user interface option to view a representation of a database structure of a database application. A second user interface option enables a user to select a portion of the representation of the database structure. A third user interface option enables a user to trigger creation of a folder structure for a Document Management System (DMS) based on the selected portion of the representation of the database structure.

In a more specific embodiment, the method further includes providing a fourth user interface option to adjust permissions for users to access one or more folders of the folder structure based on permissions associated with one or more database objects of the database structure. The fourth user interface option further includes an option to synchronize one or more permissions and/or grants associated with the selected portion of the representation of the database structure with one or more ACLs associated with one or more folders of the folder structure.

The specific example method further includes providing a user interface that provides a mechanism to prompt a user to create a trigger for synchronizing one or more database objects of the database structure with one or more folders of the DMS. The trigger may be configured to selectively automatically generate a component (e.g., a folder) of the folder structure when a corresponding database object (e.g., a database table of an ERP application) of the database structure is created.

A fifth user interface option enables a user to specify a mapping between one or more foreign keys of a database and one or more folders of a proposed folder structure of a DMS. A sixth user interface option facilitates creation of a DMS folder structure based on the proposed folder structure. A seventh user interface option facilitates creation of a trigger to selectively update a DMS folder structure in response to a change detected in a database hierarchy.

An alternative method provides a user interface that facilitates mirroring a database structure with a folder structure, wherein the user interface includes a first user interface control that is adapted to enable a user to navigate a database structure and view one or more relationships between database objects. A second user interface control is adapted to enable a user to select one or more relationships between database objects, yielding one or more selected relationships in response thereto. A third user interface control facilitates creation of a folder structure in a file system or other persistent store (e.g., database) based on the one or more selected relationships.

Another example method includes determining an organizational structure of content provided via a database application and providing a signal in response thereto, and then adjusting a folder structure of a Document Management System (DMS) based on the signal.

Hence, in an example operative scenario, an accounts payable administrator may wish to create a new folder when a new supplier is identified in an ERP application. Similarly, an administrator of a given business unit may wish to create a new folder structure in the DMS when a business unit engages in a new business function for which corresponding unstructured content will be stored in the DMS. In certain embodiments disclosed herein, if a DMS folder is created to store related content, users that have permissions to, for example, an Accounts Payable function in the ERP application that are granted access to this business unit will also be authorized to the folder. DMSs typically have their own user interface with their own authentication and authorization to gain access to folders, subfolders and documents. Now, when a user logs into the DMS, the user will see a folder structure that is reminiscent of the structure of the enterprise system database (e.g., ERP application) and the portion of rows or other database objects to which they are authorized.

While various applications, such as document linkers, may attempt to synchronize or map content between an ERP system and a DMS, such systems typically do not both enable a user to selectively control or adjust mapping or synchronizing database structures with corresponding folder structures of a DMS while simultaneously facilitating management of access privileges between the DMS database objects and corresponding folders and files of the DMS. Hence, certain embodiments disclosed herein may facilitate efficient adjustment of folder structures to match a rapidly changing database content of an ERP system while simultaneously facilitating management of DMS access rights to files and folders in accordance with access rights of corresponding database objects of an ERP system.

A further understanding of the nature and the advantages of particular embodiments disclosed herein may be realized by reference of the remaining portions of the specification and the attached drawings.

BRIEF DESCRIPTION OF THE DRAWINGS

FIG. 9b is a diagram of a second user interface display screen for setting folder-creation triggers, where the second user interface display screen may be activated via the first example user interface display screen of FIG. 9a.

DETAILED DESCRIPTION OF EMBODIMENTS

Figure 1:
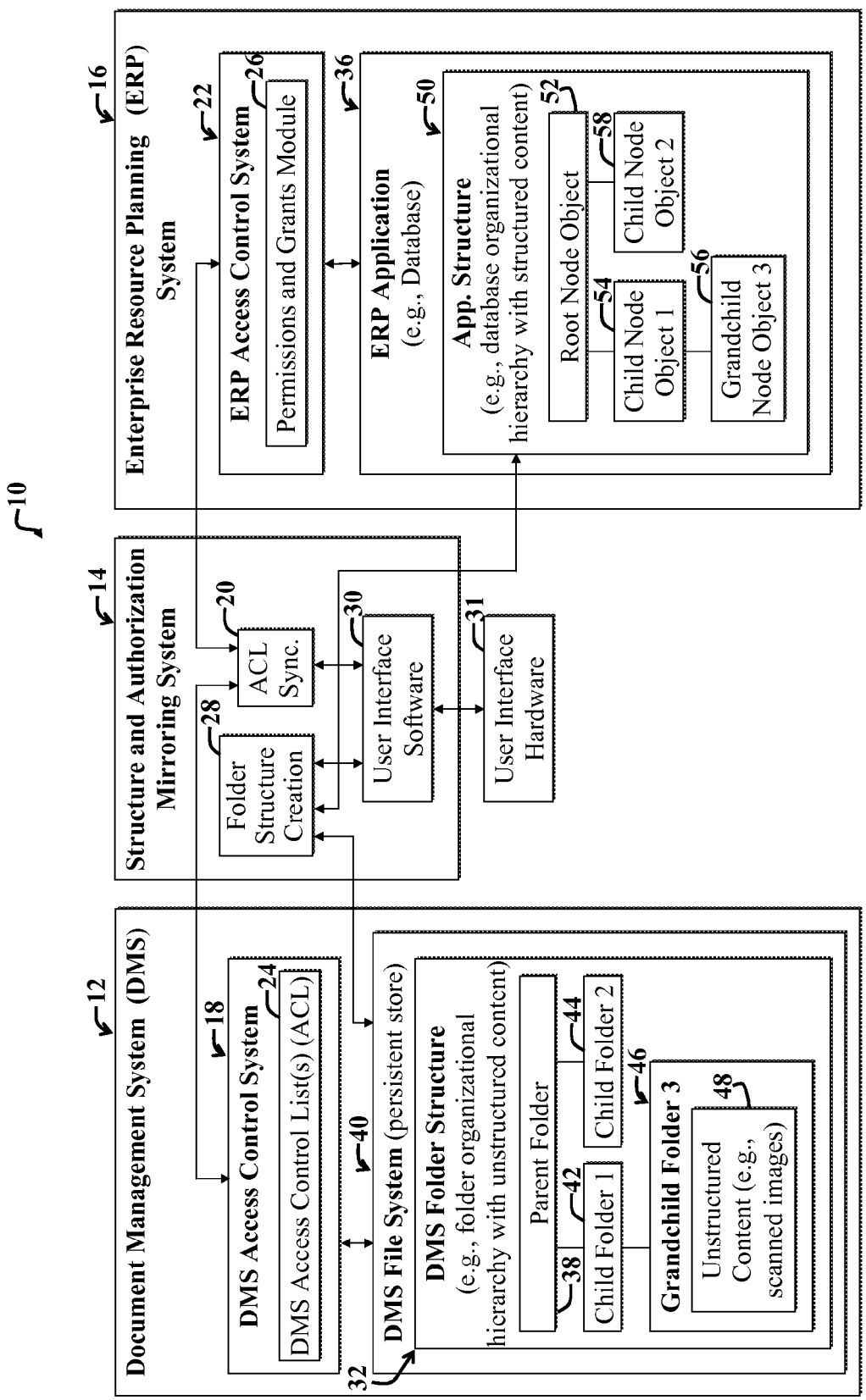
FIG. 1 is a diagram illustrating an example embodiment of system for selectively mapping or mirroring organizational structures and authorization policies between an Enterprise Resource Planning (ERP) and a Document Management System (DMS).

Although the description has been described with respect to particular embodiments thereof, these particular embodiments are merely illustrative, and not restrictive.

While the present description has been described primarily with reference to the mirroring or synchronizing of organizational hierarchies and access rights/privileges between ERP systems and DMSs, embodiments are not limited thereto. For example, any two computer systems or applications (e.g., a document imaging system and a workflow system or a records management system) that exhibit organizational hierarchies may have their structures and access privileges adjusted, mapped, or linked in accordance with the present teachings and without departing from the scope thereof. Furthermore, while the present application discusses mappings between two different systems (e.g., ERP and DMS), multiple systems may be simultaneously synchronized or mapped in accordance with the present teachings without departing from the scope thereof.

In addition, while the present description primarily discusses adjusting a folder structure of a DMS in accordance with adjustments made to an organizational structure of a database of an ERP system, embodiments are not limited thereto. For example, changes to a folder structure may inform the structure of an application (instead of or in addition to vice versa) without departing from the scope of the present teachings. Furthermore, in certain embodiments disclosed herein, the ERP system and accompanying application(s) may be replaced with any enterprise software application (also called enterprise application) that employs one or more databases or structured content.

Enterprise software applications, such as Customer Relationship Management (CRM), Business Intelligence (BI), and Enterprise Resource Planning (ERP) software, often include databases with various database objects, also called data objects or entities. A database object may be any collection of data, such as data pertaining to a particular financial account, asset, employee, contact, and so on. Examples of database objects include, but are not limited to, records, tables, or other database entities corresponding to accounts receivables, products, employees, customers, business resources, and so on.

For the purposes of the present discussion, ERP software may be any set of computer code that is adapted to facilitate managing resources of an organization. Example resources include Human Resources (HR), financial resources, assets, employees, and so on, of an enterprise. The terms "ERP software" and "ERP application" may be employed interchangeably herein. However, an ERP application may include one or more ERP software modules or components, such as user interface software modules or components.

Similarly, a DMS may include a file system or other persistent store with a hierarchy of folders, which may contain and facilitate organization of documents, files, and so on. Examples of documents that may be stored via a DMS include but are not limited to scanned receipts, purchase orders, invoices, contracts, notes, and so on.

For the purposes of the present discussion, a file system may be a system and/or method for facilitating organizing files, such as documents, scanned images, and so on, for retrieval by a computer system's operating system or by other applications running on the computer system.

A folder structure may be any folder or collection of folders for including documents or other folders in a file system (or persistent store), such as a file system of a DMS. A folder may be any representation of a container or other mechanism that may include files, documents, or other folders. A folder of a file system or other persistent store may be any group of one or more files identified by a particular location in the file system or other persistent store, where the particular location is identified in part by a folder name. The terms "folder" and "directory" may be employed interchangeably herein.

A DMS may be any computer system or program used to store documents or files, such as images of paper documents. A DMS may also be called a content management system. A content management system that is employed in an enterprise is often called an Enterprise Content Management (ECM) system.

For clarity, certain well-known components, computer operating systems, routers, power supplies, and so on, have been omitted from the figures. However, those skilled in the art with access to the present teachings will know which components to implement and how to implement them to meet the needs of a given application.

FIG. 1 is a diagram illustrating an example enterprise computing environment 10, which includes an example embodiment of a system 14 for selectively mapping or mirroring organizational structures 32, 50 and authorization policies 18, 22 between an ERP system 16 and a DMS 12. While the system 14 is shown separately from the DMS 12 and the ERP 16, in practice, the system 14 may be implemented on the same computer or different computers as the ERP 16 and DMS 12. In general, the entire computing environment 10 may be implemented via one or more computers, e.g., various components may be distributed over a network or may be included on a single computer system. Similarly, while various modules of the computing environment 10 are shown as separate modules, certain modules may be combined or separated without departing from the scope of the present teachings.

For the purposes of the present discussion, a computing environment may be may be any collection of computing resources used to perform one or more tasks involving computer processing. An enterprise computing environment may be any computing environment used for a business or public entity. An example enterprise computing environment includes various computing resources distributed across a network and may further include private and shared content on Intranet Web servers, databases, files on local hard discs or file servers, email systems, document management systems, portals, and so on.

The computing environment 10 includes the structure an authorization mirroring system 14, also called an ERP-DMS mapping system, in communication with the DMS 12 and the ERP 16. The DMS 12 is shown including a DMS access control system 18, which maintains a DMS access control list 24. The DMS further includes a DMS file system 40 in communication with the DMS access control system 18. The DMS access control system 18 regulates and/or specifies user access to and other privileges (e.g., modification privileges) associated with various folders 38, 42-46 and/or content 48 of the DMS folder structure 32, as discussed more fully below.

The DMS file system 40 maintains a DMS folder structure 32, also called a folder organizational hierarchy. Note that a persistent data storage mechanism (also called persistent store) other than a file system (e.g., another database) may be employed to accommodate the folder structure 32 without departing from the scope of the present teachings. The DMS folder structure 32 may include various folders 38, 42-48 for maintaining so-called unstructured content, such as scanned images and other documents and/or files. In the present embodiment, such unstructured content is user accessible via a DMS user interface or via a user interface of the ERP system 16. In the present example embodiment, such user interface functionality may be incorporated in the user interface software 30 and user interface hardware 31 of the structure and authorization mirroring system 14. However, such functionality may be included in separate user interfaces without departing from the scope of the present teachings.

For illustrative purposes, the folder structure 32 is shown including a parent folder 38, which includes a first child folder 42 and a second child folder 44. The first child folder 42 includes a third child folder, called a grandchild folder 46. The grandchild folder 46 includes unstructured content 48, such as documents and files. Note that the various folders 38, 42-46 and content 48 and the organization thereof represent merely an example DMS folder structure. For example, each of the folders 38, 42-46 may include additional folders and/or content.

The example ERP system 16 includes an ERP access control system 22 with a specification of one or more permissions and/or grants to access, modify, and/or manipulate data, as maintained via an accompanying ERP permissions and grants module 26. The permissions and grants module 26 may be implemented similarly to an Access Control List (ACL), where an ACL may be any set, list, or other specification of permissions associated with an object or data, such as a file, folder, or database object, e.g., a table, row, column, and so on. An ERP application 36 communicates with the ERP access control system 22, which regulates user access to various applications and objects of the ERP system 16, as discussed more fully below.

In the present example embodiment, the ERP application 36 implements a relational database, which includes a relational database structure 50. The relational database structure is also called the application structure or the database organizational hierarchy. For the purposes of the present discussion, a relational database may be any organized collection of data, wherein data is organized via database objects, such as tables, records, and so on, and wherein each of the database objects may be characterized by one or more relationships between one or more other objects in the database.

For illustrative purposes, the application structure 50 is shown including a root node object 52, such as a database table. The root node object is related, e.g., via a foreign key to a first child node object 54 and to a second child node object 58. Similarly, the first child node object 54 can be used to access a grandchild node object 56, such as via a foreign key in the first child node object 54.

For the purposes of the present discussion, a foreign key may be a mechanism for referencing another key in a database object, i.e., relation, such as a table. A database object, such as a table that has a referenced foreign key, is called the referencing table. The referencing table has, as one of its attributes, values comprising a key of the table referenced by the referencing table.

In the present example embodiment, the DMS folder structure 32 of the DMS 12 has been synchronized or mirrored with (i.e., mapped to) the application structure 50 via the structure an authorization mirroring system 14. The parent folder 38 of the DMS folder structure 32 corresponds to the root node object 52 of the application structure 50; the first child folder 42 of the DMS 12 corresponds to the first child node object 54 of the ERP system 16; the second child folder 44 corresponds to the second child node object 58; and the grandchild folder 46 corresponds to the grandchild node object 56.

The structure and authorization mirroring system 14 includes a folder-structure creation module 28 and an ACL synchronization module 20 in communication with user interface software 30. The user interface software 30 is user accessible via user interface hardware 31, which may include a monitor, keyboard, mouse, and/or additional or other user interface devices and mechanisms. The folder structure-structure creation module 28 further communicates with the DMS file system 40 and the ERP application 36.

In operation, the structure an authorization mirroring system 14 includes computer code for using the application structure 50 and accompanying user permissions (corresponding to an authorization policy) specified by the ERP permissions and grants module 26 to selectively effect changes to the folder structure 32 and accompanying user permissions specified by the DMS ACL 24. The user interface software 30 may provide various user options to control how changes made to the application structure 50 and ERP permissions and grants module 26 affect corresponding changes made to the DMS folder structure and associated DMS ACL 24, as discussed more fully below. The user interface software 30 may provide initial setup steps for a user to configure ongoing operation of the structure and authorization mirroring system 14. For example, certain triggers may be created, such as to cause automatic creation of a folder in the DMS folder structure 32 when a corresponding row or table is created in the application structure 50.

The folder structure creation module 28 in the structure and authorization mirroring system 14 may include instructions, i.e., computer code, for causing creation of one or more folders in the DMS folder structure 32 as needed. Such computer code may include code for employing Web-based Distributed Authoring and Versioning (WEBDav) protocols to create folders in the DMS folder structure 32. Similarly, the ACL synchronization module 20 may be adapted to use Business Prosecution Execution Language (BPEL) synchronization methods and WEBDav protocols to update the DMS ACL 24 in response to changes detected in the permissions and grants module 26. The user interface software 30 may include instructions for providing one or more user interface options to configure operation of the ACL synchronization module 20, as discussed more fully below. Those skilled in the art with access to the present teachings may readily employ WEBDav protocols and BPEL methods to facilitate implementing embodiments discussed herein without undue experimentation.

In a first operative scenario, the DMS folder structure 32 is initially created, e.g., via the structure and authorization mirroring system 14, based on a preexisting application structure 50. For example, the parent folder 38 of the DMS folder structure may be created based on the root node object 52 of the application structure 50. When the first child node object 54 is created, the corresponding child folder 42 is created, and so on. The folder structure 32 may grow in concert with the growth of the application structure 50. The resulting folder structure 32 may substantially parallel the application structure 50. Hence, an authorized user that is familiar with the application structure 50 may more readily navigate the folder structure 32 to access desired content.

Additions and modifications to the application structure 50 may be made via interface software associated with the ERP application 36. Such user interface software may run on the same computer as the ERP system 16. Similarly, the ERP system 16 may be included on a similar computer as the DMS 12 and the structure and authorization mirroring system 14. Accordingly, for clarity and simplification, such user interface functionality is grouped in the user interface software 30 in the present example embodiment. Similarly, DMS user interface software may facilitate enabling a user to access the DMS folder structure 32 and content therein. Such DMS user interface software may be grouped in the user interface software 30. Note that separate user interface software and modules, such as DMS user interface software running on the DMS system 12 and user interface software running on the ERP system 16 may be employed instead or in addition to the user interface software 30 shown grouped in the structure and authorization mirroring system 14.

Alternatively, instead of employing the application structure 50 to create the initial folder structure 32 and to adjust the DMS folder structure 32 thereafter, a preexisting folder structure may be selectively modified in accordance with the application structure 50 via the structure and authorization mirroring system 14. For example, in another operative scenario, a user may initially manually configure the preexisting folder structure 32 to approximate the application structure 50. Changes made to the folder structure 32 thereafter may be made in accordance with changes made to the application structure 50. Alternatively, the structure and authorization mirroring system 14 may include computer-readable instructions for automatically reorganizing the folder structure 32 in accordance with the application structure 50. Alternatively, a wizard may be employed to facilitate reorganization of the folder structure 32 in accordance with the application structure 50.

Alternatively, or in addition, the structure an authorization mirroring system 14 may include computer-readable instructions for analyzing a preexisting folder structure 32 and providing indications to users of the ERP application 36 to enable users of the ERP application 36 to match the folder structure as relationships are built and database objects are added to the application structure 50.

In certain implementations, the application structure 50 will not conform to an obvious hierarchical data model that can be precisely mirrored by a folder structure. In such implementations, similarities between the resulting folder structure 32 and the application structure 50 can be determined by a user-defined mapping. A user may employ the user interface software 30 to facilitate establishing such a mapping. For example, the folder structure 32 may be set up such that only certain relationships between objects of the application structure 50 will cause corresponding folder and subfolder creation.

When a new folder is added to the DMS folder structure 32 in response to the addition of a database object (to the application structure 50), such as a table or row of a table in the application structure 50, user access permissions to the new DMS folder may be specified in the DMS ACL 24. Generally, the user access permissions to the new DMS folder will correspond to the user access permissions to the corresponding created database object in the application structure 50. However, an authorized user may employ the user interface software 30 of the structure and authorization mirroring system 14 to affect how such changes are made to the DMS ACL 24 based on changes made to the ERP permissions and grants module 26.

When ongoing changes to the DMS folder structure 32 are made in response to corresponding ongoing changes to the application structure 50, the DMS folder structure 32 and application structure 50 are said to be mirrored or synchronized. Similarly, when changes to the ERP permissions and grants module 26 result in corresponding changes made to the DMS ACL(s) 24, the ACL(s) 24 and the permissions and grants module 26 are said to be mirrored or synchronized.

In particular, for the purposes of the present discussion, a first ACL (or permissions and grants module) is said to be synchronized with a second ACL (or permissions and grants module) if for one or more changes made to the first or second ACL, one or more corresponding changes are made to the second or first ACL, respectively. For example, if a first ACL list is modified to allow a particular manager to delete a particular table of a database, a second ACL list of a DMS may be modified to enable the manager to delete a folder of the DMS that corresponds to the particular table. The first ACL and the second ACL are said to be synchronized to reflect changes. Note that changes need not be direct, such that the changes or synchronization may be performed in accordance with a predetermined mapping that specifies predetermined types of modifications that are made to one ACL in response to specific types of changes that are made to another synchronized ACL. Similarly, folder structure and application structure synchronization need not be direct, such that changes made to each structure may be according to a particular specified mapping. Such mappings may be established by a user via the user interface software 30 and accompanying functionality of the structure and authorization mirroring system 14, as discussed more fully below.

For the purposes of the present discussion, an ACL may be a set, list, or other specification of permissions associated with an object or data, such as a file, folder, or database object, e.g., a table, row, column, and so on. A permission or user access privilege associated with an object, such as a folder of the DMS folder structure 32 or a database object of the application structure 50, may be any right of a user or particular software and/or hardware application to use the object, such as by accessing, deleting, moving, or otherwise manipulating or viewing the object. A permission may specify, for example, which users or system processes have been granted access to or have been granted other predetermined privileges to (e.g., privilege to delete, modify, move, open, save, and so on) a given object and may further specify the particular permissions that a given user or process has. An example ACL entry in an ACL specifies a subject and an operation. For example, an ACL entry for a particular folder might be: (Joe, Delete), indicating that Joe has permission to delete the folder associated with the ACL entry.

In general, when discussing an enterprise system application (e.g., ERP application 36), a permission may be manifested as an authorization to perform a function, such as Manage Invoices. In addition, when referring to an enterprise system application, such as an ERP database, a grant may refer to the assignment of the permission to a principle (e.g., person or role). The grant may be specific to a subset of data. For example, a grant may pertain to a Manage Invoices function for a North American Business Unit.

A software object, such as a database object, may be any group of software components and/or data that are part of a similar data structure or that otherwise may be grouped by associations between the components or functionality of the components. Examples of database objects include tables, records, rows, and so on. Examples of file system objects (or objects of another persistent storage mechanism) include folders, files, and so on.

The DMS access control system 18 and the ERP access control system 22 may employ Business Process Execution Language (BPEL) synchronization to facilitate maintaining current ACL(s) 24 and permissions and grants specifications 26. WEBDav protocols may be employed by the ACL synchronization module 20 of the structure and authorization mirroring system 14 to further update the ACL 24 and permissions and grants module 26 in response to changes made to the DMS folder structure 32 and application structure 50.

Figure 2:
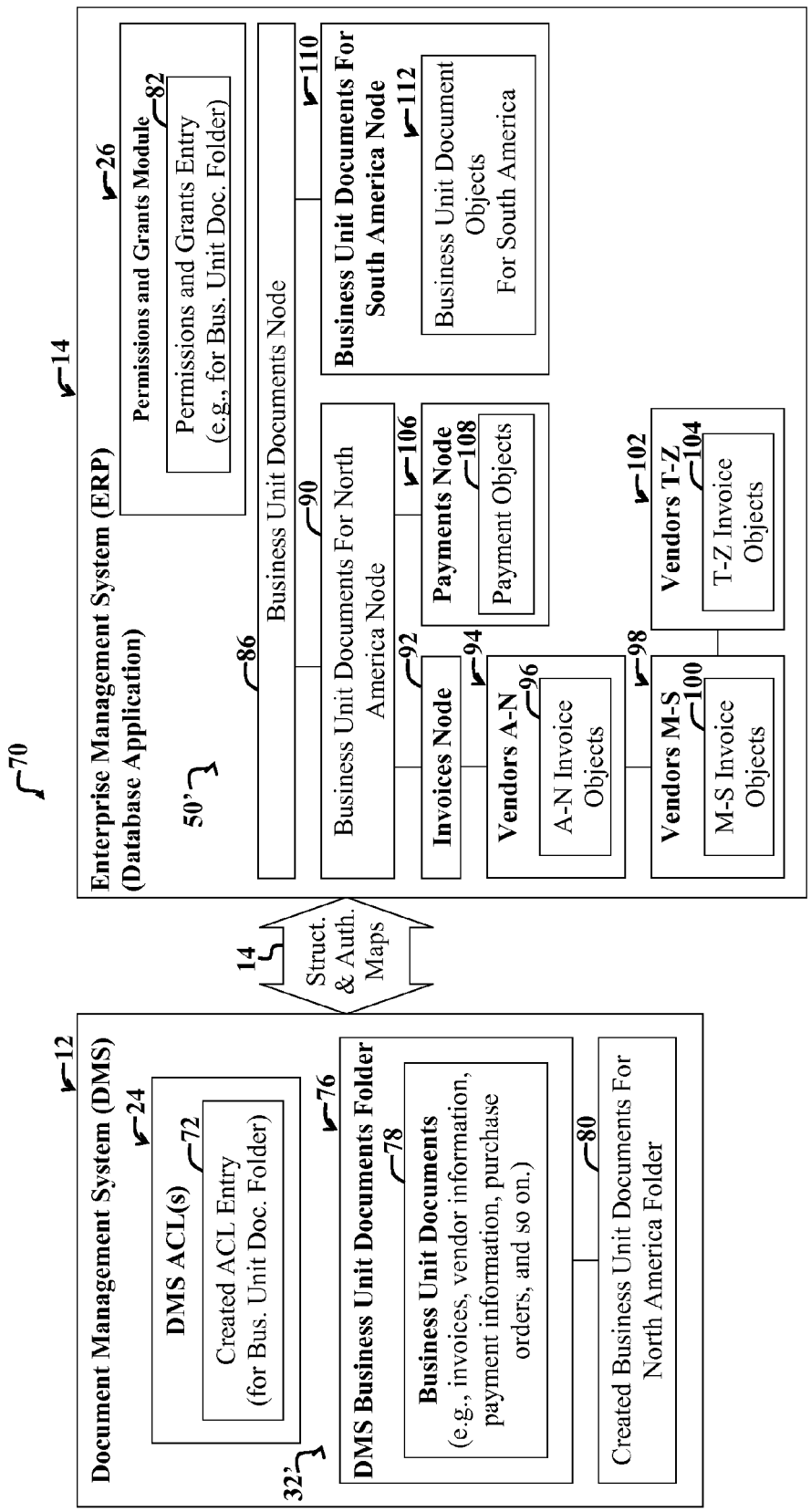
FIG. 2 is a diagram illustrating example components of a database structure of an ERP system and example components of a folder structure of a DMS system which may be adjusted in accordance with the example system of FIG. 1.

FIG. 2 is a diagram illustrating example components of a second example database structure 50' of an ERP system 14 and example components of a second example folder structure 32' of a DMS system 12 which may be adjusted in accordance with the example system 14 of FIG. 1.

The second example folder structure 32' is shown including a DMS business units documents folder 76, which includes various business unit documents 78, such as invoices, vendor documents, purchase orders, various scanned images, and so on. With reference to FIGS. 1 and 2, the DMS business unit documents folder 76 may have been created in response to the creation of a business unit documents node 86 in the second example database structure 50'. However, the example database structure 50' includes various objects, such as an invoices node 92, which references a vendors A-N node 94, which references a vendors M-S node 98, which references a vendors T-Z node 102, and so on, which are referenced by a business unit documents for North America node 90, which is referenced by the Business unit documents node 86. In addition, a business units documents for South America node 110, which includes associated objects 112, is referenced by the business unit documents node 86, such as via one or more foreign keys.

In an example operative scenario, a user employs the structure and authorization mirroring system 14 of FIG. 1 to browse the example database structure 50' and select the business unit documents for North America node 90 for creation of a corresponding folder 80 as a subfolder of the DMS business unit documents folder 76. In general, a user will first browse (e.g., via the user interface software 30 of FIG. 1) to the business unit documents node 86 and then view the associated application structure 50'. The browsing functionality may be rendered via the user interface software 30 of FIG. 1 with reference to foreign keys associated with the node 86.

The business unit documents for North America node 90 may have certain user permissions associated therewith. Accordingly, when the corresponding business unit documents for North America folder 80 is created, access privileges associated with the folder 80 may be set (via modification to the ACL 24 via addition of an ACL entry 72) via the user interface software 30 of FIG. 1 to correspond to or match (mirror) the permissions associated with the corresponding node 90 as specified via a corresponding permissions and grants entry 82 in the ERP grants and permissions module 26.

Similarly, a user may choose to create subfolders under the created business unit documents for North America folder 80 by selecting one or more of the corresponding nodes 92-108 from the application structure 50'. In addition, a user may employ the structure and authorization mirroring system 14 of FIG. 1 to create a business unit documents for South America node in the DMS business unit documents folder 76.

In the present illustrative example operative scenario, the folder content 78 of the DMS business unit documents folder 76 has not yet been organized into corresponding folders. The user interface software 30 of the structure and authorization mirroring system 14 of FIG. 1 may include computer-readable instructions for accessing any metadata associated with the various content 78 to automatically transfer the content to associated folders. For example, any DMS content 78 in the DMS business unit documents folder 76 corresponding to vendor A-N invoice objects 96, vendor M-S invoice objects 100, vendor T-Z invoice objects 104, vendor payment objects 108, and so on, may be transferred to any newly created vendor A-N, M-S, T-Z, and vendor payment folders (not shown), respectively.

Implementation details for assigning metadata to content to enable automatic sorting in accordance with an embodiment herein are implementation specific. Those skilled in the art with access to the present teachings may readily implement content-tagging functionality to tag content to enable sorting in accordance with an embodiment disclosed herein without undue experimentation.

Hence, the structure and authorization mirroring system 14 of FIG. 1 may substantially obviate the need to manually create folder structures in the DMS 12 to match the application structure 50' and to further manually adjust the DMS ACL 24 to match the ERP grants and permissions module 26. Note that adjustments to permissions made via adjustments to the DMS ACL 24 need not be limited to folder permissions. For example, permissions associated with particular files or file types may also be adjusted to relate to the ERP grants and permissions module 26 via a predetermined mapping or specification.

Conventionally, for example, an accounts payable administrator would need to create a new folder when a new supplier is identified. An administrator for a given business unit would have to create a new folder structure when a business unit engages in a new business function for which unstructured content will be stored in the DMS 12. However, in accordance with the present teachings, for example, when a North American business unit is marked as performing the business function "Accounts Receivable", the system 14 can be configured to automatically create a folder under the business unit documents for North America" for "accounts receivable documents."

In general, a user that is authorized to the transactions in the enterprise system (e.g., ERP 14) is also authorized to folders and document types in the DMS 12 to maintain consistency. Conventionally, the administrator would have to remember to revoke access to folders and document types as users move between positions, i.e., as users change roles. For example, if a Human Resources (HR) specialist who was servicing the HR needs of managers in one business unit then transfers to service the HR needs of managers in a different business unit, the HR specialist should no longer have access to HR documents in the "Transferred From" business unit in either the enterprise system (ERP 14) or the DMS 12 to maintain ACL synchronization. If the HR specialist transfers to a sales and marketing function, that user should no longer have access to HR documents, such as appraisal records, in either the enterprise system (ERP 14) or the DMS (DMS 12). Conventionally, such tasks were difficult to consistently enforce, and consequently, resulted in delays and inefficiencies.

In accordance with the present teachings, if access to view an object in the transactional system (ERP 12) changes, e.g., is revoked, then access to the corresponding object in the DMS 12 may be automatically revoked. For example, if a user is authorized to view accounts payable invoices, the user may be able to access and view corresponding accounts payable invoices application pages and may be further automatically authorized to access and view DMS objects of the type "accounts payable invoices." If authority to view accounts payable invoices is revoked in the security system (e.g., the ERP grants and permissions module 26), then the user may automatically no longer be authorized to the view accounts payable invoices application pages or DMS objects of the type accounts payable invoices." Hence, for example, when a user is authorized to "manage receivables" for the "North American Business Unit" they may automatically be listed in the ACL 24 to enable access to the corresponding folder. Similarly, when an authorization to "manage receivables" for the "North American Business Unit" is revoked from a user, the ACL entry for user may be automatically removed from the ACL 24 so that the user no longer has access to a corresponding "accounts receivable documents" folder for the "North American Business Unit."

In another example operative scenario, the example database structure 50' is replaced with a database structure corresponding to a ledger and chart of accounts. In this case, when a user creates a ledger, the user is able to employ the structure and authorization mirroring system 14 of FIG. 1 to create a folder structure for the ledger and periods in the DMS 12. Similarly, when a balancing segment value (generally representing a company or other legal entity) is created in the database of an ERP, a corresponding balancing segment value subfolder may be created in a DMS, and so on.

Figure 3:
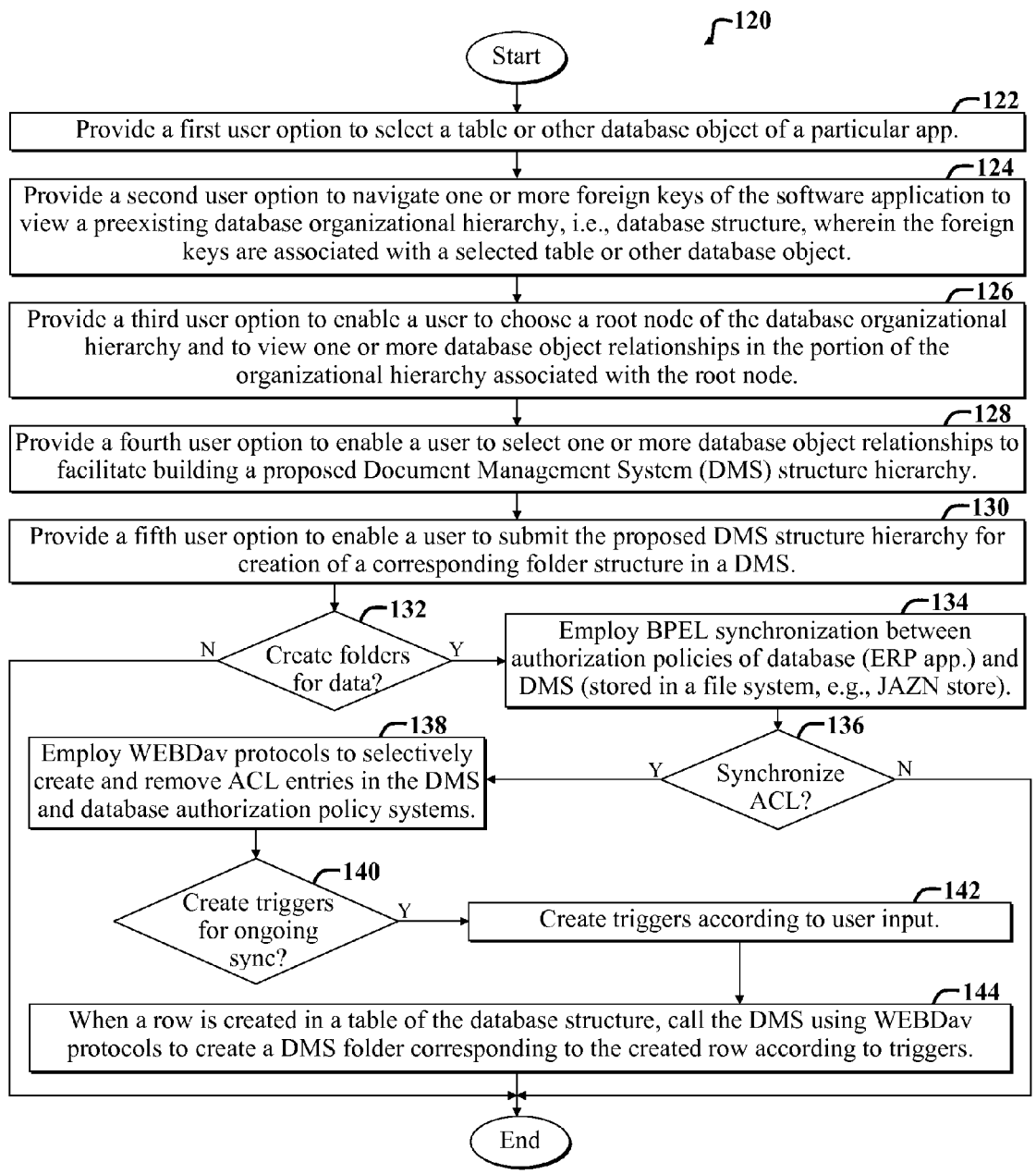
FIG. 3 is a flow diagram of a first example method implemented via the system of FIG. 1.

FIG. 3 is a flow diagram of a first example method 120 implemented via the structure and authorization mirroring system 10 of FIG. 1. Various user options discussed below with reference to the example method 120 may be provided in part via the user interface software 30 of the system 10 of FIG. 1. The user interface options may be provided via dialog boxes or other user interface mechanisms.

The first example method 120 includes a first step 122, which includes providing a user option to select a database table or other object of a particular software application that includes a database.

A second step 124 includes providing a second user option to navigate one or more foreign keys of the software application, e.g., database of an enterprise application, to view a preexisting database organizational hierarchy, i.e., database structure, wherein the foreign keys are associated with a selected table or other database object.

A third step 126 includes providing a third user option to enable a user to choose a root node (e.g., the node 52 of FIG. 1) of the database organizational hierarchy and to view one or more database object relationships in the portion of the organizational hierarchy associated with the root node.

A fourth step 128 includes providing a fourth user option to enable a user to select one or more database object relationships to facilitate building a proposed Document Management System (DMS) structure hierarchy.

A fifth step 130 includes providing a fifth user option to enable a user to submit the proposed DMS structure hierarchy for creation of a corresponding folder structure, i.e., mirrored folder structure, in a DMS. The mirroring of the folder structure relative to the application organizational hierarchy may be performed in accordance with a user specified mapping function or a predetermined mapping function.

A sixth step 132 includes prompting a user to create a folder structure or not. If a mirrored folder structure is to be created, then a seventh step 134 is performed; otherwise, the method 120 completes.

The seventh step 134 includes creating a folder structure that mirrors a selected portion of the database structure, i.e., application structure corresponding to a selected portion of the organizational hierarchy of structured data maintained by the enterprise application. To create a mirrored folder structure, the structure and authorization mirroring system 14 of FIG. 1 may employ BPEL synchronization between authorization policies of the database (of the enterprise application, e.g., ERP app.) and DMS.

Subsequently, an eighth step 136 includes prompting a user to determine if synchronization or mirroring of ACLs between the enterprise application and the DMS should be performed. If ACL synchronization is to be performed, then a ninth step 138 is performed.

The ninth step 138 includes synchronizing authorization policies of the database (enterprise application) and DMS, such as by using Business Process Execution Language (BPEL) synchronization methods. The synchronization performed via the ninth step 138 may include selectively creating and removing ACL entries in any applicable ACL of the DMS and any applicable ACL of the database of the enterprise application to maintain consistent authorization policies. For example, if a new folder is created in the DMS corresponding to a particular database object, DMS ACL entries corresponding to the newly created folder will be adjusted based on the ACL defining user permissions to the database object corresponding to the newly created ACL.

Exact adjustments made to a folder's ACL based on corresponding changes to a database object's ACL may be determined in accordance with a predetermined mapping function. The mapping function may be adjusted by a user via the user interface software 30 of FIG. 1. Alternatively, a default mapping may be employed, where the default mapping makes changes to a DMS ACL so that the DMS ACL matches the corresponding ACL of the enterprise application. The ACL synchronization module 20 of the system 14 of FIG. 1 may employ WEBDav protocols (in accordance with Web Distributed Authoring and Versioning (WEBDav) Access Control Protocol) to selectively create, remove, and/or modify ACL entries in the appropriate ACL of the DMS and/or the corresponding ACL of the enterprise application.

Subsequently, a tenth step 140 includes prompting a user to determine whether triggers should be created for ongoing synchronization of hierarchical structures (e.g., DMS folder structure and database structure) and ACL entries of the DMS and enterprise application (e.g., database). If triggers are to be created, then an eleventh step 142 is performed; otherwise, the method 120 completes.

The eleventh step 142 includes providing one or more user options specify and create particular triggers for ongoing synchronization and then creating the user specified triggers. For the purposes of the present discussion, a trigger may be any mechanism that affects ongoing synchronization between data (e.g., ACL entry data) and/or structures. Ongoing synchronization may be any execution of a mapping between data and/or structures, such as a database structure and a folder structure, during runtime of a software application that is employed to perform the mapping. Note that while ACL and hierarchical structure synchronization may be implemented in part via WEBDav protocols, mechanisms in addition to or other than WEBDav protocols may be employed to facilitate a given synchronization process without departing from the scope of the present teachings.

A subsequent twelfth step 144 includes performing the following as needed and in accordance with any triggers established via the eleventh step 142: creating a DMS folder whenever a new database object (or instance thereof), e.g., database table row, is created in an enterprise application, e.g., ERP database, and/or adjusting ACL entries associated with any newly created DMS folder in accordance with ACL entries of the corresponding new database object.

Note that the various steps 122-144 of the example method 120 are merely illustrative. Certain steps may be omitted, added, or rearranged without departing from the scope of the present teachings. For example, the tenth step 140 may be broken into separate steps for prompting a user to create triggers for ongoing for folder structure synchronization with an application structure (also called hierarchical structure synchronization) and for creating triggers for ongoing ACL synchronization, also called authorization policy synchronization.

Figure 4:
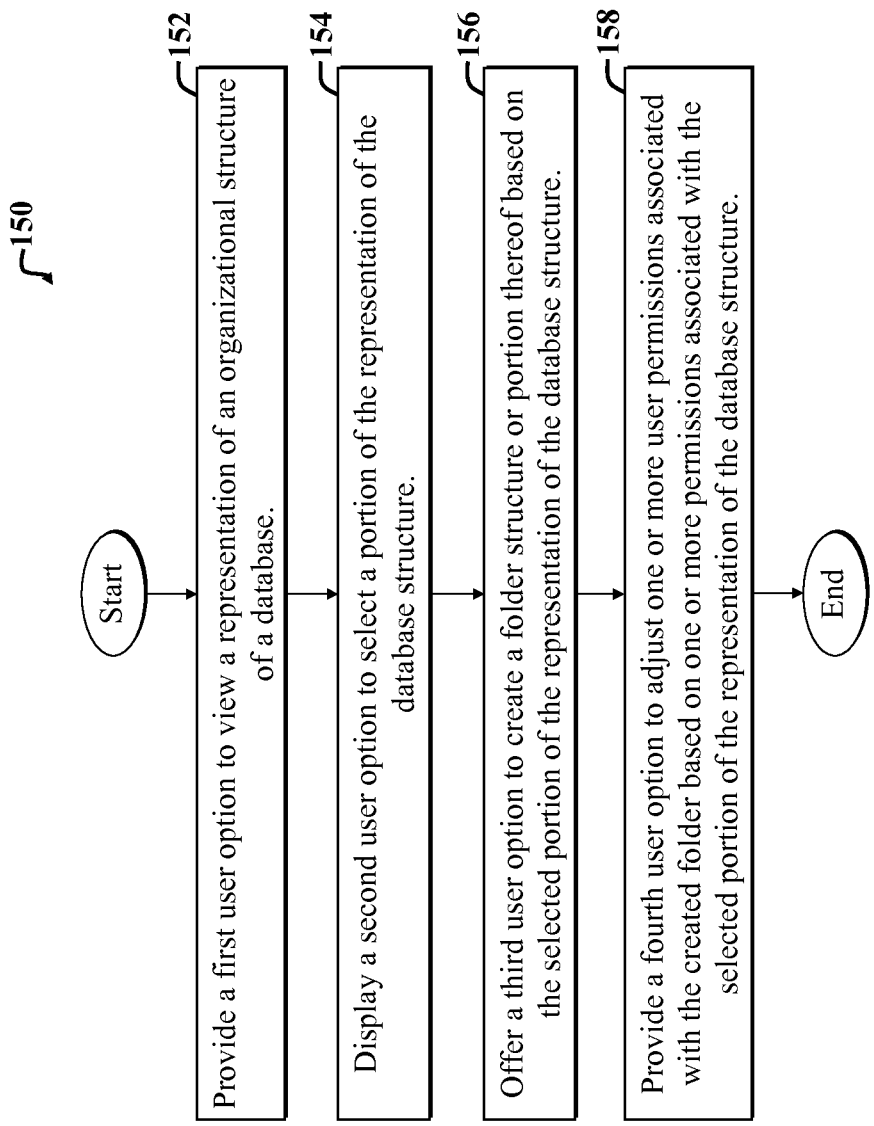
FIG. 4 is a flow diagram of a second example method implemented via the system of FIG. 1.

FIG. 4 is a flow diagram of a second example method 150 implemented via the structure and authorization mirroring system 14 of FIG. 1. The second example method 150 includes an initial database-structure viewing step 152, which includes providing a first user option to view a representation (or portion of a representation) of an organizational structure of a database.

A subsequent selecting step 154 includes displaying a second user option to select a portion of the representation of the database structure.

Next, a creating step 156 includes providing a third user option to create a folder structure or portion thereof based on the selected portion of the representation of the database structure.

Subsequently, a permissions synchronizing step 158 includes providing a fourth user option to adjust one or more user permissions associated with the folder created in step 156 based on one or more permissions associated with the selected portion of the representation of the database structure.

Figure 5:
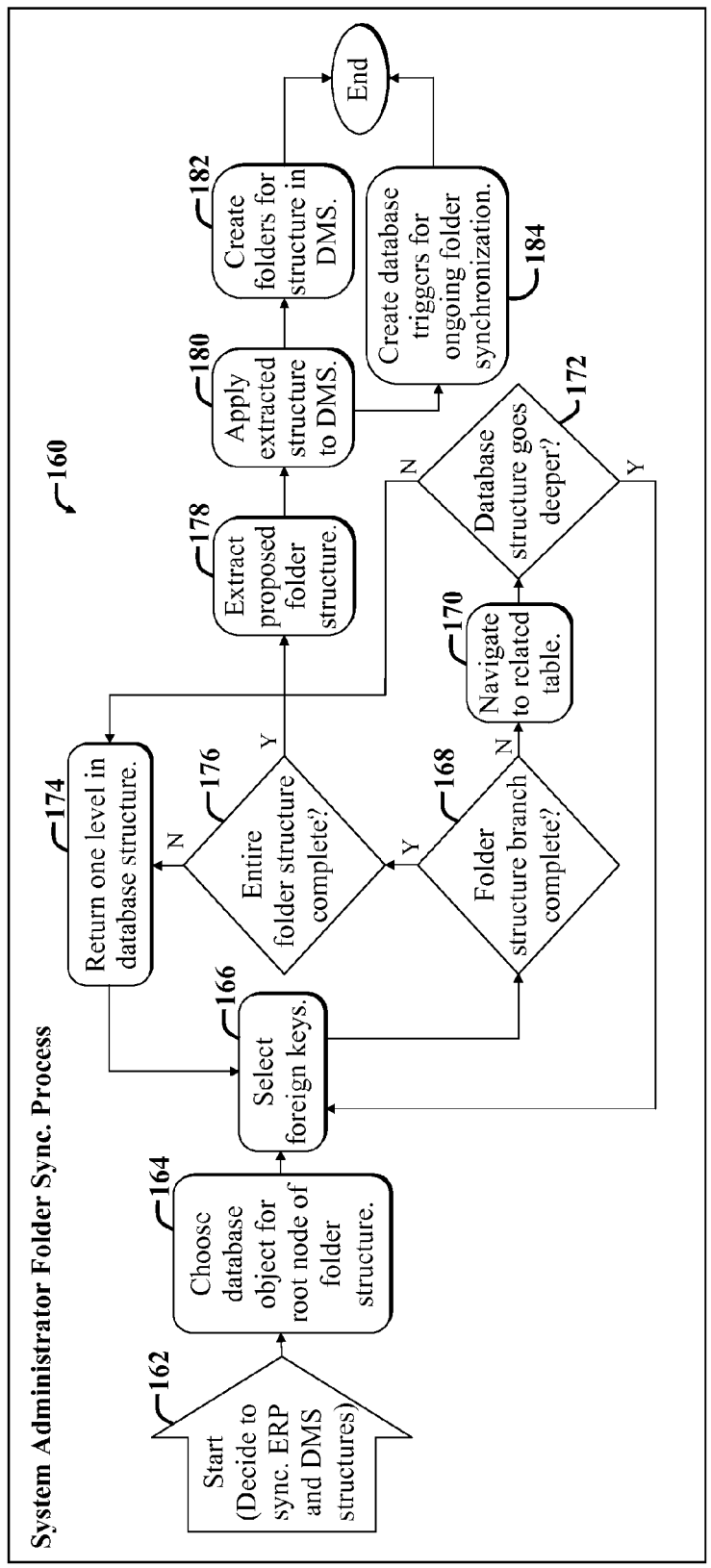
FIG. 5 is a flow diagram of an example process that may be implemented by a system administrator employing the system of FIG. 1 and accompanying user interfaces.

FIG. 5 is a flow diagram of an example process 160 that may be implemented, for example, by a system administrator employing the structure and authorization mirroring system 14 of FIG. 1 and accompanying user interfaces 30, 31. The process 160 begins at an initial decision step 162, wherein the administrator decides to synchronize one or more relationships, such as organizational hierarchical structures and/or authorization policies, between an enterprise system (e.g., the ERP system 16 of FIG. 1) and a DMS.

Subsequently, a choosing step 164 involves the system administrator employing the user interface software 30 (and hardware 31) of FIG. 1 to browse an application organizational structure (e.g., the application structure 50 of FIG. 1, also called a hierarchical structure) and to choose a root node of the application organizational structure. The root node of the application organizational structure is to correspond to a root folder of a DMS folder structure. For the purposes of the present discussion, a root node may be any entity, i.e., node, in a structural representation of an organization of data, where entity has sub nodes. For example a folder with subfolders may be considered a node in a DMS file system (or other persistent storage mechanism), while a table with various rows or other tables included or referenced therein may be considered a root node in a database structure. A sub node may be any node or depiction of a database entity that is considered within an organizational scope of a root node.

After a root node is chosen, one or more foreign keys are selected in a key-selection step 166. In a subsequent branch-checking step 168, the system administrator employs the user interface software 30 to determine if a particular branch of a proposed folder structure design is complete. If a branch is not complete, then the system administrator (user) performs a navigation step 170.

The navigation step 170 includes navigating the application structure to reach a desired table that is related to a selected foreign key. The desired table is to correspond to a folder to be created after assembly of a proposed folder structure and after a user chooses an option to create the proposed folder structure, as discussed more fully below. Subsequently, in a depth-checking step 172, the user determines if the application (i.e., database) structure goes deeper, i.e., has further foreign keys for use in navigating to one or more additional database objects, e.g., tables. If the application structure does not go deeper, then a navigation-returning step 174 is performed.

The navigation-returning step 174 includes returning up one level in the application structure hierarchy, which corresponds to one level up in a corresponding proposed folder structure being created. Subsequently, the key-selection step 166 is performed again.

If in the branch-checking step 168, the user determines that a branch of the proposed folder structure has been completed, then a completion-checking step 176 is performed. The completion-checking step 176 involves determining if construction of a proposed folder structure has been completed. If construction of the proposed folder structure has not been completed, then the user returns to the database key-checking step 166.

If in the completion-checking step 176, the user determines that the proposed folder structure has been completed, then a folder-structure extraction step 178 is performed. The folder-structure extraction step 178 involves employing the user interface software 30 of FIG. 1 to trigger extraction of the proposed folder structure for use by the folder structure creation module 28 of FIG. 1 in creating the proposed folder structure.

After extraction of the proposed folder structure via the folder-extraction step 178, a structure-application step 180 is performed. The structure-application step 180 includes applying the extracted folder structure to the DMS, which causes creation of folders and corresponding folder structures in the DMS via a folder-creation step 182, and further causes creation of any specified triggers for ongoing folder structure synchronization in a trigger-creating step 184.

Figure 6:
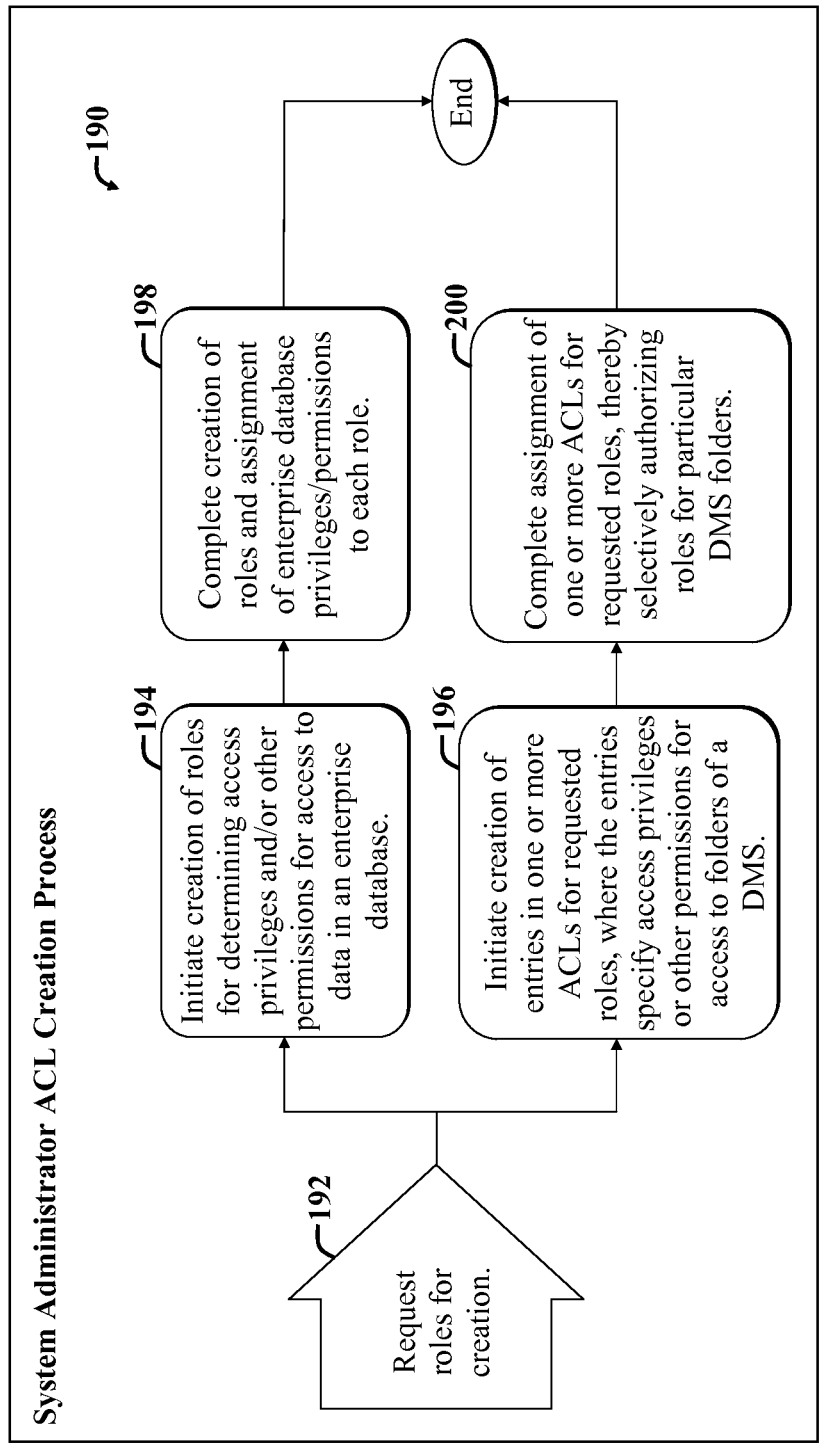
FIG. 6 is a flow diagram of a second example process that may be implemented by a system administrator employing the system of FIG. 1 and accompanying user interfaces.

FIG. 6 is a flow diagram of a second example process 190 that may be implemented, for example, by a system administrator employing the structure and authorization mirroring system 14 of FIG. 1.

The example process 190 includes an initial role-requesting step 192, whereby the system administrator (user) decides to employ the system 14 of FIG. 1 to request roles associated with permissions or access rights (also called access privileges). Roles may correspond to employee categories, e.g., manager, supervisor, clerk, and so on. For the purposes of the present discussion, a role may be any category (or specification of such a category) of personnel or employee of an organization, such that personnel associated with a given role have a certain set of permissions, e.g., as specified by one or more entries in an ACL, to access given objects of a DMS or enterprise application.

After certain roles are requested in step 192, initiation of creation of the requested roles, i.e., specification of requested roles begins at a role-creation initialization step 194. Subsequently, role creation is completed at a final role-creation step 198.

In addition, after certain roles are requested in the role-requesting step 192, ACL entries corresponding to requested roles are set up in an ACL for folders of a DMS. After the ACL entries are established, personnel are then authorized to access, modify, and/or delete, and so on, particular DMS folders in accordance with the roles assigned to the personnel.

Figure 7:
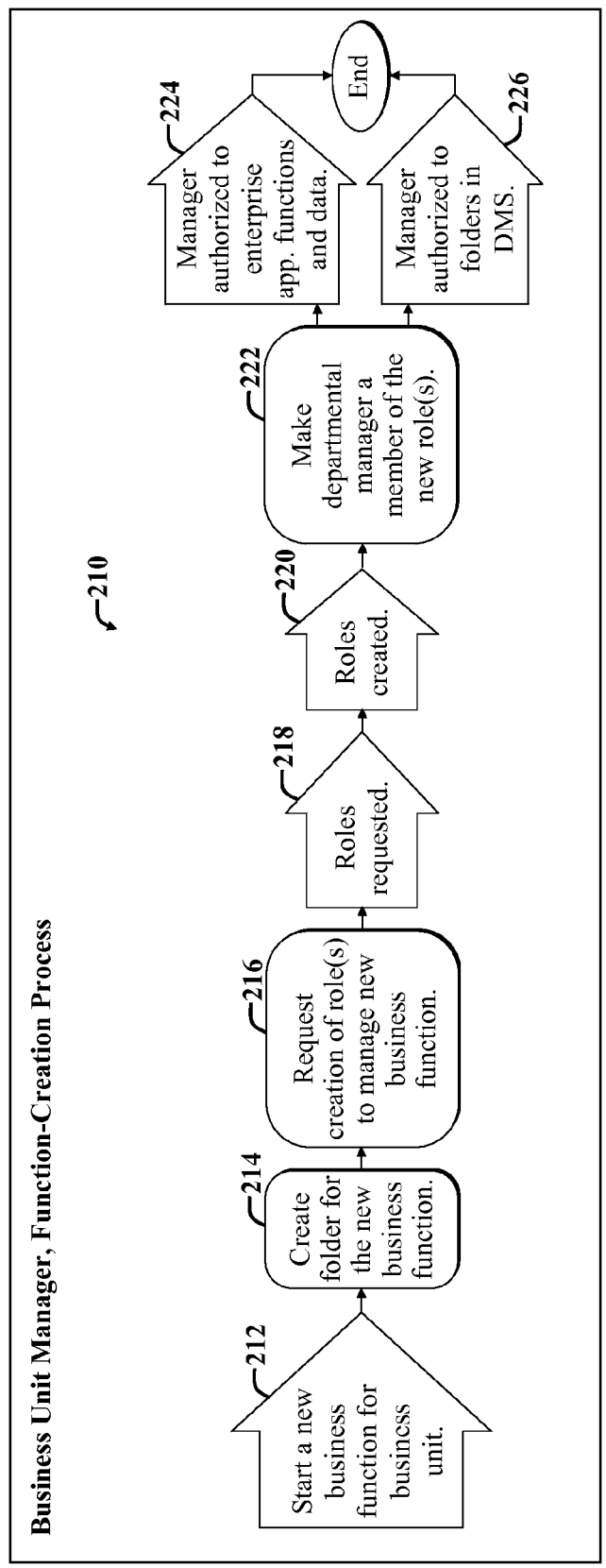
FIG. 7 is a flow diagram of an example process that may be implemented by a business unit manager employing the system of FIG. 1.

FIG. 7 is a flow diagram of an example process 210 that may be implemented, for example, by a business unit manager employing the structure and authorization mirroring system 14 of FIG. 1.

The example process 210 includes an initial business-function starting step 212. In the business-function starting step 212, a user determines a new business function for a given business unit. After a new business function is determined, a folder-creation step 214 is performed, which includes creating a folder in a DMS for the new business function.

Subsequently, in a new role-requesting step 216, the user, e.g., the business unit manager, may initiate creation for roles, such as by making a request (e.g., to appropriate personnel within the accompanying enterprise) that roles be created to manage and/or implement the new business function.

After roles have been requested at step 218, the roles are then created at a role-creation step 220. Note that functionality for defining, i.e., creating roles may be included in the user interface software 30 of FIG. 1.

For illustrative purposes, the business unit manager then assigns a departmental manager as a member of the newly created role(s) in a role-assignment step 222.

After the role-assignment step 222, an application-authorization step 224 is performed. In the application-authorization step 224, the departmental manager is selectively authorized (by the business unit manager), i.e., granted particular permissions in accordance with the new role(s) allocated to the departmental manager, to access predetermined functions and data of one or more enterprise applications, such as the ERP application 36 of FIG. 1. In addition, in a DMS-authorization step 226, the departmental manager is selectively granted (by the business unit manager) permissions to one or more folders, files, or other objects of a DMS.

Note that the various steps 212-226 of the process of FIG. 7 may be automated via one or more modules of the enterprise computing environment 10 of FIG. 1, such as via the structure and authorization mirroring system 14 and access control systems 18, 22 of the ERP 16 and DMS 12, respectively.

Figure 8:
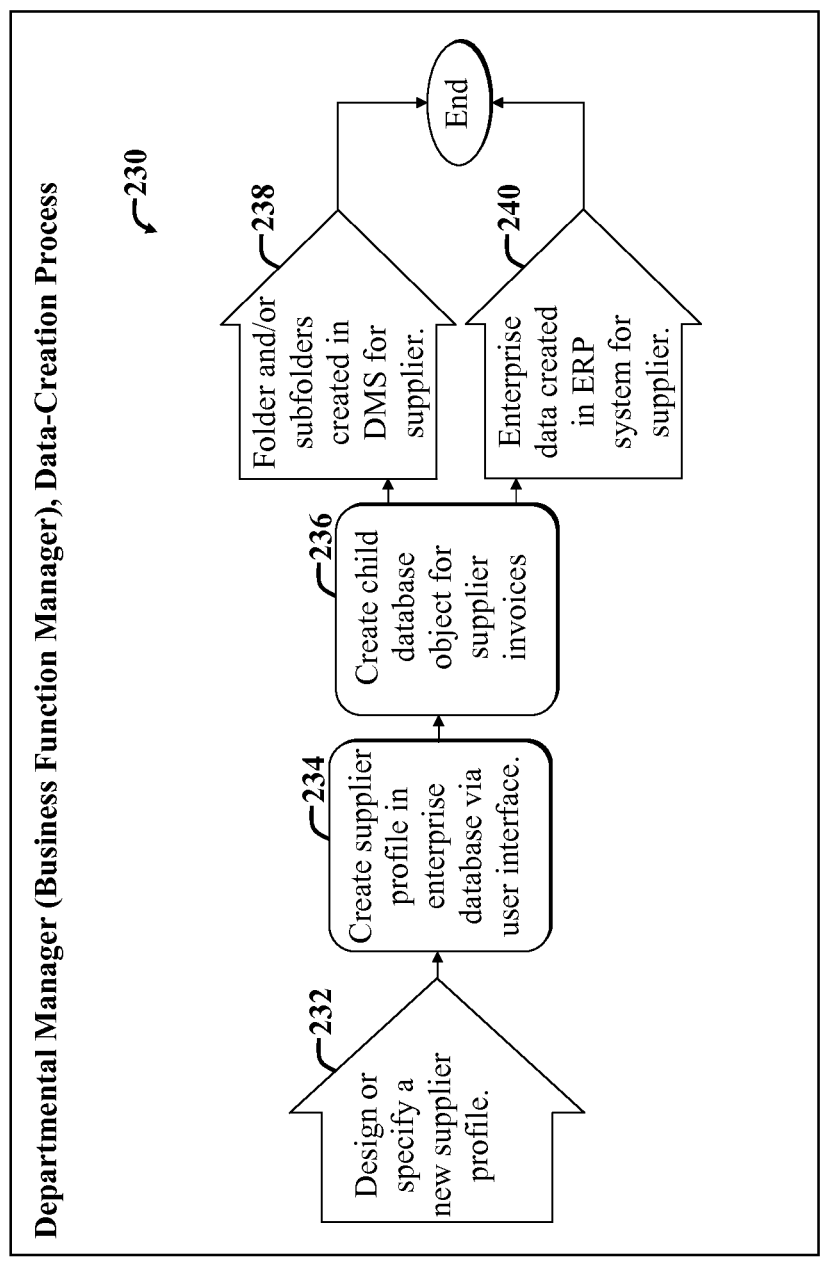
FIG. 8 is a flow diagram of an example process that may be implemented via a departmental manager or business function manager employing the system of FIG. 1.

FIG. 8 is a flow diagram of an example process 230 that may be implemented, for example, via a departmental manager or business function manager employing the structure and authorization mirroring system 14 of FIG. 1.

The example process 230 includes an initial supplier-profile creation step 232, which involves designing a new supplier profile, e.g., via the user interface software 30 of FIG. 1. A supplier profile may include a record or database object with information pertaining to a given supplier.

After the supplier profile is designed, a profile-creation step 230 is performed. In the profile-creation step 230 a supplier profile object is created in an enterprise database, such as the ERP database 36 of FIG. 1.

Subsequently, an object-creation step 236 includes creating a child database object that is a child of the supplier profile object. In the present example embodiment, the child object is adapted to contain information or references to information pertaining to supplier invoices.

Next, a folder-creation step 238 and enterprise-data creation step 240 may be performed in parallel. The folder-creation step 238 includes employing the structure and authorization mirroring system 14 of FIG. 1 to create a folder in a DMS corresponding to the supplier profile database object. A subfolder that corresponds to the child database object may also be created. The enterprise-data creation step 240 includes creating data pertaining to the supplier to populate the enterprise database object(s), e.g., the supplier profile database object and child object with data as needed. Similarly, data may be added to any newly created folders (in a DMS) for the supplier.

FIG. 9 is a diagram of a first example user interface display screen 250, which may be implemented via the user interface software 30 of FIG. 1. The first user interface display screen 250 is adapted to facilitate creating a DMS folder structure based on a database structure.

The user interface display screen 250 includes a node-identification field 252, which identifies the root node of a database structure being accessed, which in the present example is a "Business Unit" node. Additional root nodes may be searched for by selection of a search button 254. Selection of the search button 254 may open an additional user interface screen that is adapted to facilitate browsing of a database structure to select different objects, e.g., root nodes in a database structure.

A table-identification section 256 lists titles of various database tables, i.e., database objects, under consideration. A scroll bar 266 may be provided to enable a user to scroll to view any additional table names that are not initially displayed. In the present example, the table-identification section 256 is displaying a business unit name 262 and a business unit function name 264, which correspond to different tables. The table names in the table-identification section 256 may be selected by a user, e.g., by highlighting a table name and then selecting a select button 258. After selection of a table, the name of the table appears in a selected-table field 268.

The display screen 250 further includes a first tab 272 and a second tab 274, which may be user selected. Currently, the first tab 272 is selected. The first tab 272 provides various user interface controls for enabling a user to define a foreign key to folder nesting map. For the purposes of the present discussion, a user interface control may be any mechanism, such as a graphical representation or field, used to facilitate access to or use of functionality via a graphical user interface display screen. The first tab 272 shows a foreign key section 276 and a proposed-folder-structure section 278.

The foreign key section 276 displays a database structure hierarchy created with reference to foreign keys associated with the business unit node and child nodes. For example, foreign keys of the business unit node 288 reference a business functions node 290. The business functions node 290 has foreign keys to a suppliers node 296, a suppliers invoices node 298, and a suppliers payments node 300. Selectable check boxes 294 are provided adjacent to the various nodes 296-300. Expansion symbols 292 are also provided adjacent to each node 288, 290, 296-300 to enable a user to expose additional related nodes, which have been determined by the user interface software 30 with reference to foreign keys of database objects of the application structure 50 of FIG. 1.

In addition, a combine-foreign keys button 280 is included in the foreign keys section 276. Selection of the combine-foreign keys button 280 enables the combining of one or more database objects, which have been selected via adjacent check boxes 294 into a single object for the purposes of creating a folder. For example, if the suppliers invoices object/node 298 and the suppliers payments node 300 are selected, and the combine-foreign keys button 280 is then selected, then a combined node, which may be called, for example, suppliers invoices and payments, may result.

After a user has browsed foreign keys in the foreign key section 276 and has selected corresponding check boxes 294, a user may select an include-in-hierarchy button 282, which is included in the foreign key section 276. Selection of the include-in-hierarchy button 282 results in generation of a corresponding proposed folder structure, which is displayed in the proposed folder structure section 278 of the first tab 272.

The proposed folder structure section 278 displays a folder structure with proposed folders 304-310 arranged in a proposed hierarchy. For example, in the example user interface display screen 250, the proposed folder structure section 278 shows a proposed business unit folder 304 corresponding to the business unit node 288 of the foreign-key-to-folder-nesting map tab 272. The proposed business unit folder 304 includes a proposed business functions folder 306 corresponding to the business functions node 90. The proposed business functions folder 306 includes a suppliers invoices sub folder 308 and a suppliers payments subfolder 310 corresponding to the suppliers invoices node 298 and the suppliers payments node 300, respectively. Note that the suppliers node 296 does not include a corresponding folder in the proposed folder structure section 278, since the suppliers node 296 is not checked among the check boxes 294 of the foreign keys section 276. The proposed folder structure section 278 includes folder structure expansion symbols 302, which are analogous to foreign key expansion symbols of the foreign key section 276.

In an example operative scenario, a user develops a proposed folder structure in the proposed folder structure section 278 via browsing of database nodes/objects via the foreign keys section 276 and selection of nodes for inclusion in the folder structure hierarchy (via selection of the include-in-hierarchy button 282) of the proposed folder structure section 278. After creation of a proposed folder structure, as displayed in the proposed folder structure section 278, a user may select a create-folder-structure button 284.

User selection of the create-folder-structure button 284, triggers underlying user interface software (e.g., the user interface software 30 of FIG. 1) to initiate creation of a folder structure in a DMS in accordance with the proposed folder structure of the proposed folder structure section 278. A user may further select a create-mapped-folder trigger 286 in the proposed folder structure section 278.

Hence, a user may browse a database structure vie the foreign keys section 276 and select database objects of an enterprise application for which to create corresponding folders (with a similarly hierarchical structure) in a DMS. Upon selection of the create-mapped-folder trigger 286, underlying user interface software may activate one or more additional display screens, such as the folder-trigger display screen 400 of FIG. 9b.

Hence, the user interface display screen 250 facilitates enabling a user to select a table from which to create a folder hierarchy. Once a root node has been chosen, the user can see the tables that are related to the root node table. The user can select the related tables that should be included in the folder hierarchy. The user can also collapse multiple related tables into a single folder. Once a user chooses to include particular foreign keys in the folder structure, the proposed folder structure is displayed on the right hand side. Once the user is satisfied with their proposed folder structure the user may trigger execution of a script to create the folders in a DMS and to create the triggers for creating folders when rows are added in a related table. For example, a trigger may create a supplier folder that is a subfolder of a payables folder, that is a subfolder of a business function folder, that is a subfolder of a business unit, when a new supplier entity is created in an ERP database.

Figure 9A:
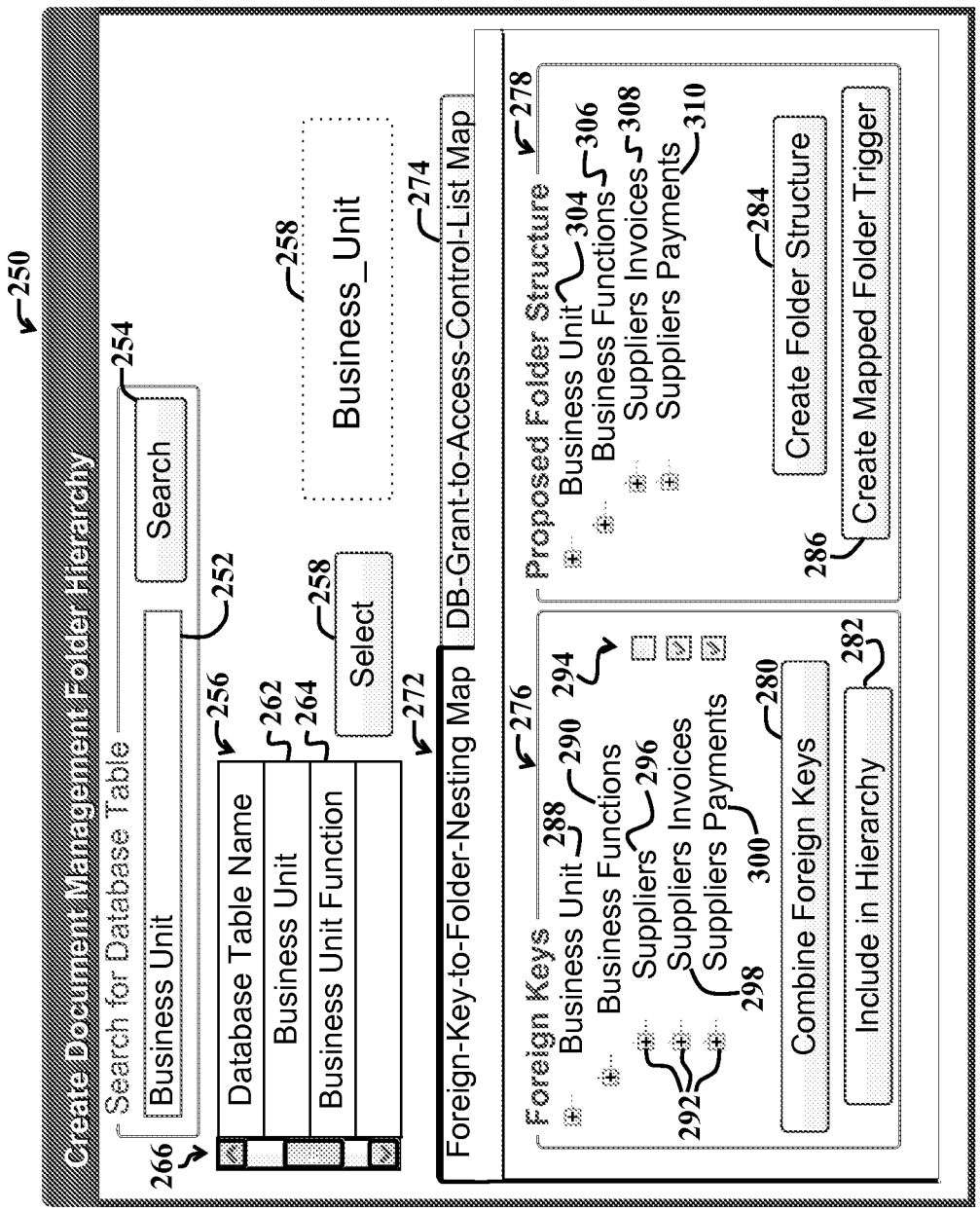
FIG. 9a is a diagram of a first example user interface display screen, which may be implemented via the user interface software and hardware of FIG. 1.
Figure 9B:
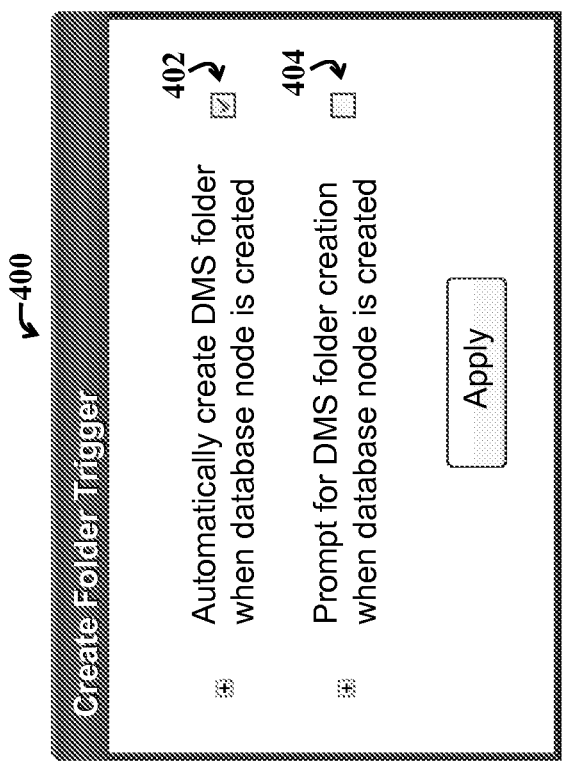

FIG. 9b is a diagram of a second user interface display screen for setting folder-creation triggers, and which may be activated via the first example user interface display screen of FIG. 9a. The folder-trigger display screen 400 of FIG. 9b is adapted to enable a user to control or otherwise specify how a folder structure of a DMS should be updated in response to creation of one or more nodes in a corresponding database structure.

For example, the example additional display screen 400 provides a first user option 402 to cause the structure and authorization mirroring system 14 of FIG. 1 to automatically create a folder structure in a DMS when a row or foreign key is created in a table is created in a table of a database, wherein the table is already associated with a folder in the DMS.

A second user interface option 404 is adapted to enable a user to trigger display of an additional dialog box (not shown) via the user interface software 30 of FIG. 1 when a new node is added to a database. The additional dialog box may enable a user to authorize or decline creation of a folder corresponding to a newly created database object, i.e., node, such as a node corresponding to a foreign key.

Note that various user interface display screens (such as the display screen 250 of FIGS. 9a and 400 of FIG. 9b) discussed herein are merely illustrative. The exact types and arrangements of user interface options and controls are implementation specific and may be modified, augmented, or replaced with other options to meet the needs of a given implementation without departing from the scope of the present teachings. For example, the user interface display screen 400 of FIG. 9b may include additional user interface options, such as for specifying particular types of database objects that will be mapped to folders; for specifying particular objects or nodes to update with corresponding folder structures in a DMS; for specifying which objects or nodes are not to have additional DMS folders created for child nodes, and so on.

Figure 10:
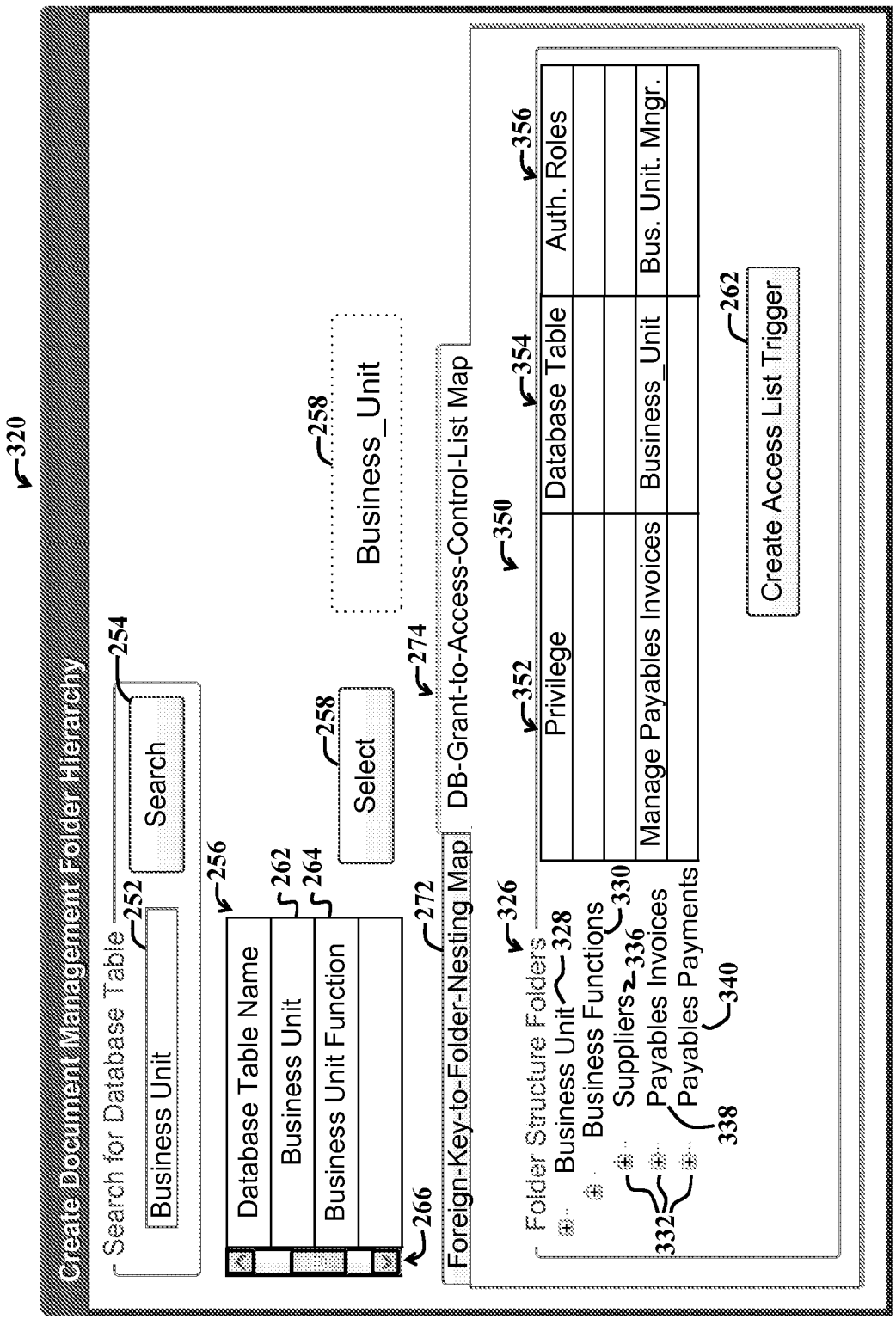
FIG. 10 is a diagram of a third example user interface display screen, which may be implemented via the user interface of FIG. 1.

FIG. 10 is a diagram of a third example user interface display screen 320, which may be implemented via the user interface software 30 and hardware 31 of FIG. 1. The third example user interface screen 320 is similar to the first example user interface display screen 250 of FIG. 9a, with the exception that the database-grant-to-access-control-list map tab 274 is selected.

The database-grant-to-access-control-list map tab 274 illustrates a proposed folder structure 326, which was created via user interface controls provided via the foreign-key-to-folder-nesting map tab 272. The proposed folder structure 326 includes a business unit node 328, a business functions child node 330, a suppliers grandchild node 336, a suppliers invoices grandchild node 338, and a suppliers payments grandchild node 340. In the present embodiment, each of the grandchild nodes 336-340 may be expanded to show additional sub-nodes via corresponding expansion controls 332.

A user may select a given node in the folder structure 326, such as the business unit node 328, to show a corresponding ACL table 350. The ACL table includes a privilege column 352, a database table column 354, and an authorized roles column 356. The privilege column 352 lists privileges associated with database objects (e.g., business unit database table) associated with a selected folder (e.g., the business unit folder 328) of the folder structure 326. The database objects are indicated in the database table column 354. Each database object is associated with one or more roles (e.g., business unit manager) indicated in the authorized roles column 356.

Upon user selection of a create-access-list trigger button 362, a DMS ACL entry corresponding to a selected folder of the folder structure 326 may be created in accordance with the nodes 326, and any updates to the resulting folder or folder structure may automatically have their ACLs updated to correspond with the ACLs of corresponding database objects. Alternatively, any updates to a folder or folder structure may trigger display of an additional dialog box that provides additional user interface options to control the content of a DMS ACL entry to be created. The additional dialog box may include for example, a user option to change an ACL entry before creation of the ACL entry or to skip creation of an ACL entry.

In the present example embodiment, the ACL table 350 may be automatically populated with authorization information derived from an ACL associated with the database structure from which the folder structure 326 was created.

Hence, the user interface display screen 320 provides various user options and accompanying user interface controls to enable a user to review proposed folder structure nodes that have been proposed in first tab 272 and then associate a privilege therewith when granted on a database table, to thereby synchronize the entry in an ACL for the folder. For example, if a grant is made that grants privilege to manage payables invoices, then an ACL entry is be made for the corresponding payables invoices folder in the DMS. When a user is comfortable with the tables and privileges assigned, the user may proceed to initiate creation of ACL triggers.

A create-proposed-hierarchy script may employ a proposed folder hierarchy to create folders and subfolders in a DMS via WEBDav protocols. A create-mapped-folder trigger script may implement a trigger that fires upon insert into one or more foreign keys. If a foreign key is mapped to a folder in the folder mappings, the trigger creates a subfolder in the DMS via WEBDav protocols. For example, if an entry is made in the foreign keys between a supplier object and a business unit database object, the trigger may create a folder for the supplier under a business unit/payables supplier folder.

A create-mapped-ACL-entry-trigger script may implement a trigger that fires when there is an entry into a database grants table of an authorization control system. An entry in such a table may grant privileges to a principle user to a database object. For example, a grant may allow a sales manager to select from the leads object for leads within their territory. If the grant is made to an object and privilege that is in a grants-to-ACL mapping, the trigger creates a corresponding folder's ACL. For example, if a grant is made to an accounts payable manager a North American Consumer Business Unit to manage payables for the North American Business Unit, then the trigger may create a corresponding entry in the ACL for a payables subfolder in a North American Business Unit folder.

Figure 11:
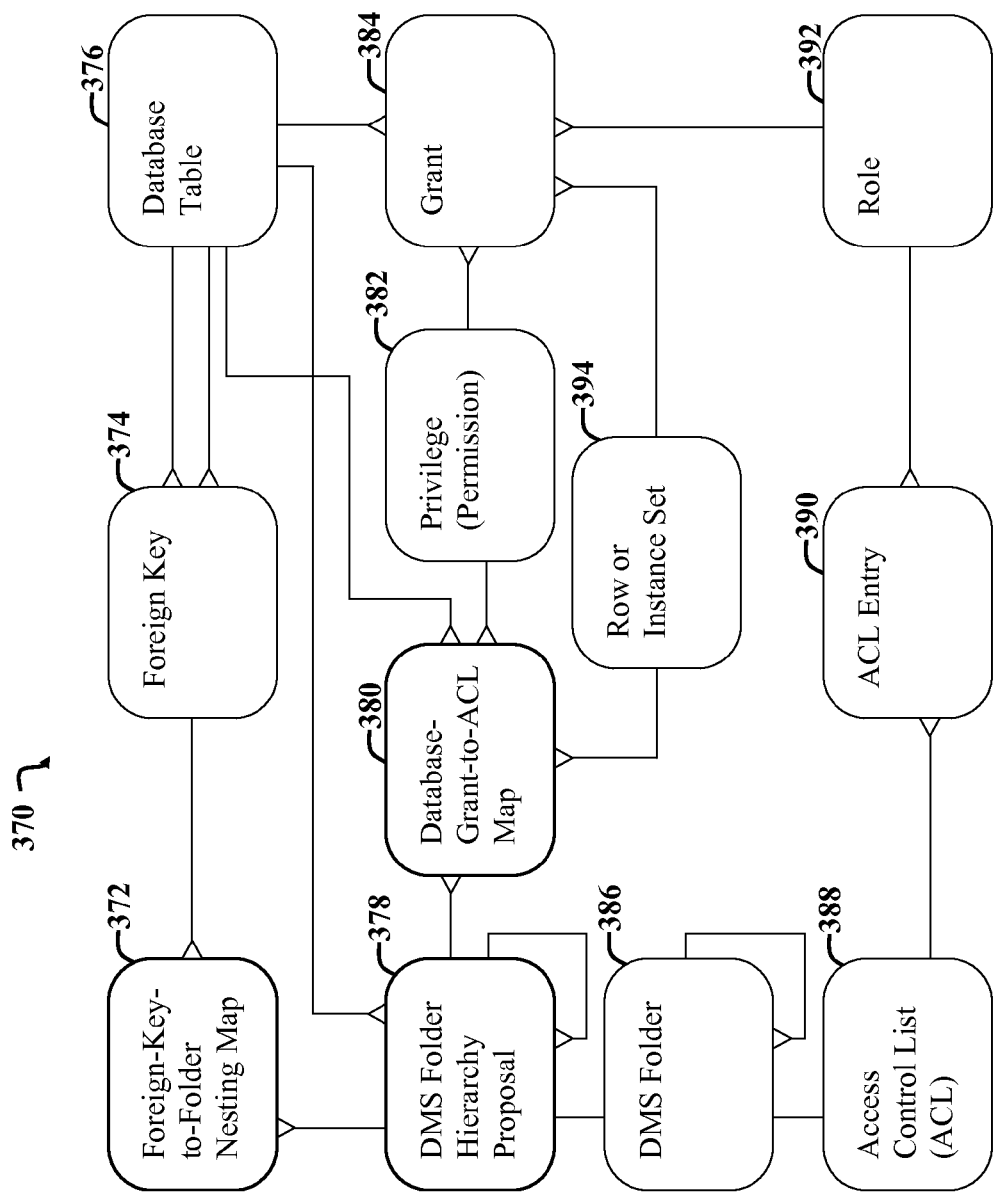
FIG. 11 is an example entity relationship diagram, which may characterize the example system of FIG. 1.

FIG. 11 is an example entity relationship diagram 370, which may represent a data model characterizing the example system 14 and accompanying computing environment 10 of FIG. 1.

The example data model 370 represents a simplified data model, which may be changed or adapted by those skilled in the art to meet the needs of a given implementation. The data model 370 illustrates example relationships between data employed by the enterprise computing environment 10 of FIG. 1. The data and relationships depicted in the data model 370 may facilitate synchronizing a DMS folder structure with a database organization hierarchy and synchronizing DMS folder structure ACLs with corresponding database ACLs.

In general, various connecting lines shown in FIG. 10 include a base (crows foot) from which each line extends to indicate a multiple-to-one relationship between a block coupled to the base of the connector and a block coupled to an opposite end of the connector. For example, a foreign-key-to-folder nesting map block 372 is coupled to a foreign key block 374 indicating that multiple foreign-key-to-folder nesting maps may be associated with a given foreign key. A foreign-key-to-folder nesting map may be a specification indicating how a given database hierarchy structure is mapped to a DMS folder structure. Such a nesting map may be developed in part via the user interface display screens of FIGS. 9-10.

The data model 370 further includes a document-folder-hierarchy proposal block 378, a document management system folder block 386, an ACL block 388, an ACL-entry block 390, a role block 392, a row-or-instance-set block 394, a grant block 384, a privilege block 382, a database-grant-to-ACL map 380, and a database table (object) block 376.

The document-folder-hierarchy proposal block 378 indicates that a given DMS folder hierarchy proposal may itself include one or more DMS folder hierarchy proposals. Plural foreign-key-to-folder nesting maps, as indicated by block 372 may be associated with a given DMS folder hierarchy proposal, as indicated by block 378. A given database table (block 376) may be associated with plural DMS folder hierarchy proposals (block 378). A given DMS folder (block 386) may be included in one DMS folder hierarchy proposal (block 378). A given DMS folder (block 386) may include one or more DMS folders (block 386). A given ACL (block 388) may be associated with one DMS folder (block 386) and may be associated with plural ACL entries (block 390).

A given database table (block 376) may be associated with plural sets of foreign keys (block 374), which may be associated with plural foreign-key-to-folder-nesting maps (block 372). Furthermore, a given database table (block 376) may be associated with plural DMS folder hierarchy proposals (block 378); plural grants (block 384); and plural database-grant-to-ACL maps (block 380).

A given user role (block 392) may be associated with plural ACL entries (block 390) and plural grants (block 384). A given privilege (block 382) may be associated with plural grants of privileges or permissions (block 384) and with plural database-grant-to-ACL maps (block 380). Multiple database-grant-to-ACL maps (block 380) may be associated with a given DMS folder hierarchy proposal (Block 378); with a given row or instance set (block 394); with a given database table (block 376), and so on, as indicated in FIG. 11.

The DMS folder hierarchy proposal entity corresponding to the block 378 stores a recommended folder structure after interrogating the database data dictionary for foreign keys from the start node. Block 378 may include foreign keys that maintain relations to a table that represents the start node of a folder hierarchy. Block 378 relates to itself to illustrate the proposed hierarchy.

The foreign-key-to-folder nesting map entity 372 entity stores the foreign key entries from which the folder structure has been derived. A new row created in a foreign key may cause creation of a new folder. For example, a new row in an FK table with a source of Supplier with a value of ACME LTD and target of Business Unit with a value of North American Consumer may trigger the creation of a folder ACME LTD under a payables management folder under a North American Consumer Business Unit folder.

The database-grant-to-ACL map entity 380 stores the mapping between a grant of a nominated privilege on a database object to an entry in an ACL for a folder. For example, the privilege to manage payables invoices of a business unit table may trigger creation of an entry in the ACL of a payable invoices folder in an appropriate parent folder. Block 380 may include various foreign keys, e.g., a relation to a DMS folder proposal, a relation to a privilege, and a relation to a database table.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method performed by one or more processors comprising:
selecting, in response to user input, a root node of a relational database wherein the relational database is included in an Enterprise Resource Planning (ERP) application;
showing, using the one or more processors, the root node and one or more child nodes in a first window of a user interface, with a hierarchical structure of the root node and the one or more child nodes determined by one or more foreign keys;
displaying, in the first window of the user interface and using the one or more processors, selection control areas adjacent to the root node and the one or more child nodes to allow selection of nodes to be included in a proposed hierarchical folder structure;
adjusting, in response to user input and using the one or more processors, permissions for users to access one or more folders of the proposed hierarchical folder structure based on permissions associated with a database object of the relational database;

synchronizing, using the one or more processors, one or more permissions and/or grants associated with the root node and one or more child nodes with one or more Access Control Lists (ACLs) associated with one or more folders of the proposed hierarchical folder structure;
and
showing using the one or more processors, the proposed hierarchical folder structure for a Document Management System (DMS) in a second window of the user interface, with folders in the hierarchical folder structure having names and child/parent relationships mirroring the hierarchical structure of the root node and the one or more child nodes.

2. The method of claim 1 further including:
prompting a user of the user interface to create a trigger for synchronizing one or more database objects of the relational database with one or more folders of the DMS.

3. The method of claim 2 wherein the trigger is adapted to automatically generate a component of the proposed hierarchical folder structure when a corresponding database object of the relational database is created.

4. The method of claim 3 wherein the component of the proposed hierarchical folder structure includes a file folder, and wherein the corresponding database object includes a table of a database included in an ERP application.

5. The method of claim 1 further including:
specifying, using the one or more processors, a mapping between one or more foreign keys of a database and one or more folders of the proposed hierarchical folder structure, with the proposed hierarchical folder structure defining a DMS.

6. The method of claim 5 further including:
generating, using the one or more processors, a DMS folder structure based on the proposed hierarchical folder structure.

7. The method of claim 6 wherein the relational database includes a relational database of an Enterprise Resource Planning (ERP) system.

8. The method of claim 5 wherein nodes correspond to data objects and further including selectively updating a DMS folder structure in response to a change detected in data objects.

9. The method of claim 8 wherein updating further includes:
creating, in the DMS folder structure, a DMS folder in response to creating a database object.

10. The method of claim 8 wherein updating further includes prompting, with the user interface, a user when a database object is created in the database.

11. An apparatus comprising:
one or more processors;
a monitor in data communication with the one or more processors;
logic encoded in one or more tangible media for execution by the one or more processors and when executed operable to:
select, in response to user input, a root node of a relational database wherein the relational database is included in an Enterprise Resource Planning (ERP) application;
show, the root node and one or more child nodes in a first window of a user interface displayed on the monitor, with a hierarchical structure of the root node and the one or more child nodes determined by one or more foreign keys;
display, in the first window of the user interface, selection control areas adjacent to the root node and the one or more child nodes to allow selection of nodes to be included in a proposed hierarchical folder structure;
adjust, in response to user input, permissions for users to access one or more folders of the proposed hierarchical folder structure based on permissions associated with a database object of the relational database;
synchronize one or more permissions and/or grants associated with the root node and one or more child nodes with one or more Access Control Lists (ACLs) associated with one or more folders of the proposed hierarchical folder structure;
and
show the proposed hierarchical folder structure for a Document Management System (DMS) in a second window of the user interface, with folders in the hierarchical folder structure having names and child/parent relationships mirroring the hierarchical structure of the root node and the one or more child nodes.

12. A non-transitory processor-readable storage device for providing a design pattern for a software application, the non-transitory processor-readable storage device comprising one or more instructions for:
selecting, in response to user input, a root node of a relational database wherein the relational database is included in an Enterprise Resource Planning (ERP) application;
showing the root node and one or more child nodes in a first window of a user interface, with a hierarchical structure of the root node and the one or more child nodes determined by one or more foreign keys;
displaying, in the first window of the user interface, selection control areas adjacent to the root node and the one or more child nodes to allow selection of nodes to be included in a proposed hierarchical folder structure;
adjusting, in response to user input, permissions for users to access one or more folders of the proposed hierarchical folder structure based on permissions associated with a database object of the relational database;
synchronizing one or more permissions and/or grants associated with the root node and one or more child nodes with one or more Access Control Lists (ACLs) associated with one or more folders of the proposed hierarchical folder structure; and
showing the proposed hierarchical folder structure for a Document Management System (DMS) in a second window of the user interface, with folders in the hierarchical folder structure having names and child/parent relationships mirroring the hierarchical structure of the root node and the one or more child nodes.

13. The non-transitory processor-readable storage device of claim 12 with the one or more instructions for:
prompting a user of the user interface to create a trigger for synchronizing one or more database objects of the relational database with one or more folders of the DMS.

* * * * *

UNITED STATES PATENT AND TRADEMARK OFFICE
CERTIFICATE OF CORRECTION

| | | |
|---|---|---|
| PATENT NO. | : 8,812,439 B2 | Page 1 of 1 |
| APPLICATION NO. | : 13/053899 | |
| DATED | : August 19, 2014 | |
| INVENTOR(S) | : King et al. | |

It is certified that error appears in the above-identified patent and that said Letters Patent is hereby corrected as shown below:

On the title page, item [57], column 2, line 3, delete "management" and insert -- Management --, therefor.

In the Specification

Column 2, line 15, delete "management" and insert -- Management --, therefor.

In the Claims

Column 23, line 8, Claim 1, delete "showing" and insert -- showing, --, therefor.

Column 24, line 33, Claim 12, delete "showing" and insert -- showing, --, therefor.

Column 24, line 51, Claim 12, delete "showing" and insert -- showing, --, therefor.

Signed and Sealed this
Fourteenth Day of July, 2015

Michelle K. Lee
*Director of the United States Patent and Trademark Office*